(12) United States Patent
Langnes et al.

(10) Patent No.: US 10,975,687 B2
(45) Date of Patent: Apr. 13, 2021

(54) WELL AND OVERBURDEN MONITORING USING DISTRIBUTED ACOUSTIC SENSORS

(71) Applicant: BP Exploration Operating Company Limited, Middlesex (GB)

(72) Inventors: Tommy Langnes, Weybridge (GB); Pradyumna Thiruvenkatanathan, Richmond (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 0 days.

(21) Appl. No.: 16/566,711

(22) Filed: Sep. 10, 2019

(65) Prior Publication Data
US 2020/0048999 A1 Feb. 13, 2020

Related U.S. Application Data

(63) Continuation of application No. PCT/EP2018/058174, filed on Mar. 29, 2018.
(Continued)

(51) Int. Cl.
*E21B 47/107* (2012.01)
*E21B 47/117* (2012.01)
(Continued)

(52) U.S. Cl.
CPC .......... *E21B 47/107* (2020.05); *E21B 47/117* (2020.05); *G01N 29/11* (2013.01); *G01N 29/4427* (2013.01); *G01V 1/001* (2013.01)

(58) Field of Classification Search
CPC .. E21B 47/101; E21B 47/1025; E21B 47/107; E21B 47/117; G01N 29/11; G01N 29/4427; G01V 1/001
(Continued)

(56) References Cited

U.S. PATENT DOCUMENTS 3,563,311 A 2/1971 Stein
3,841,144 A 10/1974 Baldwin
(Continued)

FOREIGN PATENT DOCUMENTS

CA 2760662 A1 12/2010
CA 2953938 A1 1/2016
(Continued)

OTHER PUBLICATIONS

PCT/EP2018/058174 International Search Report and Written Opinion dated Jun. 29, 2018 (14 p.).
(Continued)

*Primary Examiner* — Michael P Nghiem
*Assistant Examiner* — Dacthang P Ngo
(74) *Attorney, Agent, or Firm* — Conley Rose, P.C.

(57) ABSTRACT

A method of detecting a leak event within a wellbore can include inducing a pressure differential within a wellbore comprising a fluid, obtaining a sample data set representative of the acoustic signal across a frequency spectrum while inducing the pressure differential, determining a plurality of frequency domain features of the sample data set, determining a presence of a leak event at one or more depths within the wellbore based on determining that the plurality of frequency domain features match a leak event signature, correlating the leak event with the induced pressure differential, and determining a presence and location of a leak within the wellbore based on the presence of the leak event and the correlating of the leak event with the induced pressure differential.

30 Claims, 9 Drawing Sheets

Related U.S. Application Data

(60) Provisional application No. 62/479,873, filed on Mar. 31, 2017.

(51) Int. Cl.
  G01N 29/11 (2006.01)
  G01N 29/44 (2006.01)
  G01V 1/00 (2006.01)

(58) Field of Classification Search
  USPC .......................................................... 702/51
  See application file for complete search history.

(56) References Cited

U.S. PATENT DOCUMENTS

| | | | |
|---|---|---|---|
| 3,854,323 | A | 12/1974 | Hearn et al. |
| 5,042,297 | A | 8/1991 | Lessi |
| 5,113,941 | A | 5/1992 | Donovan |
| 5,257,530 | A | 11/1993 | Beattie et al. |
| 5,812,493 | A | 9/1998 | Robein et al. |
| 5,825,017 | A | 10/1998 | Pryor |
| 5,971,095 | A | 10/1999 | Ozbek |
| 6,075,611 | A | 6/2000 | Dussan V. et al. |
| 6,151,556 | A | 11/2000 | Allen |
| 6,201,765 | B1 | 3/2001 | Ireson |
| 6,450,037 | B1 | 9/2002 | McGuinn et al. |
| 6,501,067 | B2 | 12/2002 | Jones et al. |
| 6,516,275 | B2 | 2/2003 | Lazaratos |
| 6,550,342 | B2 | 4/2003 | Croteau et al. |
| 6,555,807 | B2 | 4/2003 | Clayton et al. |
| 6,587,798 | B2 | 7/2003 | Kersey et al. |
| 6,601,458 | B1 | 8/2003 | Gysling et al. |
| 6,601,671 | B1 | 8/2003 | Zhao et al. |
| 6,651,007 | B2 | 11/2003 | Ozbek |
| 6,672,131 | B1 | 1/2004 | Aldal et al. |
| 6,738,715 | B2 | 5/2004 | Shatilo et al. |
| 6,751,559 | B2 | 6/2004 | Fookes et al. |
| 6,782,150 | B2 | 8/2004 | Davis et al. |
| 6,813,403 | B2 | 11/2004 | Tennyson |
| 6,829,538 | B2 | 12/2004 | de Kok |
| 6,837,098 | B2 | 1/2005 | Gysling et al. |
| 6,904,368 | B2 | 6/2005 | Reshef et al. |
| 6,933,491 | B2 | 8/2005 | Maida, Jr. |
| 7,028,543 | B2 | 4/2006 | Hardage et al. |
| 7,030,971 | B1 | 4/2006 | Payton |
| 7,072,044 | B2 | 7/2006 | Kringlebotn et al. |
| 7,088,639 | B2 | 8/2006 | Walls et al. |
| 7,130,496 | B2 | 10/2006 | Rogers |
| 7,219,762 | B2 | 5/2007 | James et al. |
| 7,355,923 | B2 | 4/2008 | Reshef et al. |
| 7,357,021 | B2 | 4/2008 | Blacklaw |
| 7,395,864 | B2 | 7/2008 | Ramachandran et al. |
| 7,398,697 | B2 | 7/2008 | Allen et al. |
| 7,404,456 | B2 | 7/2008 | Weaver et al. |
| 7,503,217 | B2 | 3/2009 | Johansen |
| 7,652,245 | B2 | 1/2010 | Crickmore et al. |
| 7,659,828 | B2 | 2/2010 | Wehrs et al. |
| 7,660,200 | B2 | 2/2010 | Tang |
| 7,872,736 | B2 | 1/2011 | Rogers et al. |
| 7,890,280 | B2 | 2/2011 | Fomme |
| 7,896,069 | B2 | 3/2011 | Dria et al. |
| 7,940,389 | B2 | 5/2011 | Rogers et al. |
| 7,946,341 | B2 | 5/2011 | Hartog et al. |
| 8,020,616 | B2 | 9/2011 | Greenaway |
| 8,023,829 | B2 | 9/2011 | Nash et al. |
| 8,131,121 | B2 | 3/2012 | Huffman |
| 8,200,049 | B2 | 6/2012 | Kaplan et al. |
| 8,245,780 | B2 | 8/2012 | Fidan et al. |
| 8,248,589 | B2 | 8/2012 | DeFreitas et al. |
| 8,264,676 | B2 | 9/2012 | Kanellopoulos et al. |
| 8,408,064 | B2 | 4/2013 | Hartog et al. |
| 8,520,197 | B2 | 8/2013 | Handerek |
| 8,534,114 | B2 | 9/2013 | Ellson |
| 8,564,786 | B2 | 10/2013 | Crickmore et al. |
| 8,576,386 | B2 | 11/2013 | Jones et al. |
| 8,605,542 | B2 | 12/2013 | Coates et al. |
| 8,614,795 | B2 | 12/2013 | Duncan et al. |
| 8,634,681 | B2 | 1/2014 | Rogers |
| 8,661,907 | B2 | 3/2014 | Davis et al. |
| 8,755,643 | B2 | 6/2014 | Nash et al. |
| 8,797,824 | B2 | 8/2014 | Crickmore et al. |
| 8,902,704 | B2 | 12/2014 | Zamow et al. |
| 8,923,663 | B2 | 12/2014 | Hill et al. |
| 8,941,821 | B2 | 1/2015 | Coupe et al. |
| 8,950,482 | B2 | 2/2015 | Hill et al. |
| 8,973,444 | B2 | 3/2015 | Hill et al. |
| 8,996,298 | B2 | 3/2015 | Yamada |
| 8,997,585 | B2 | 4/2015 | Hayward |
| 9,002,149 | B2 | 4/2015 | Rogers |
| 9,052,230 | B2 | 6/2015 | Kutlik et al. |
| 9,075,155 | B2 | 7/2015 | Luscombe et al. |
| 9,109,944 | B2 | 8/2015 | Den Boer et al. |
| 9,110,018 | B2 | 8/2015 | Handerek |
| 9,140,582 | B2 | 9/2015 | Farhadiroushan et al. |
| 9,140,815 | B2 | 9/2015 | Lopez et al. |
| 9,146,151 | B2 | 9/2015 | Kupershmidt |
| 9,228,889 | B2 | 1/2016 | McCann |
| 9,243,949 | B2 | 1/2016 | Crickmore et al. |
| 9,250,112 | B2 | 2/2016 | Godfrey |
| 9,250,120 | B2 | 2/2016 | Smith et al. |
| 9,255,836 | B2 | 2/2016 | Taverner et al. |
| 9,304,017 | B2 | 4/2016 | Handerek |
| 9,341,731 | B2 | 5/2016 | Biswas |
| 9,347,313 | B2 | 5/2016 | Wills et al. |
| 9,354,338 | B1 | 5/2016 | Psaila |
| 9,377,551 | B2 | 6/2016 | Hartog et al. |
| 9,377,559 | B2 | 6/2016 | Cooper |
| 9,388,685 | B2 | 7/2016 | Ravi et al. |
| 9,416,644 | B2 | 8/2016 | McEwen-King et al. |
| 9,423,523 | B2 | 8/2016 | McEwen-King |
| 9,429,466 | B2 | 8/2016 | Barfoot et al. |
| 9,430,507 | B2 | 8/2016 | Stowe et al. |
| 9,435,668 | B2 | 9/2016 | Lewis et al. |
| 9,435,902 | B2 | 9/2016 | Hill et al. |
| 9,453,821 | B2 | 9/2016 | Minto et al. |
| 9,459,329 | B2 | 10/2016 | McEwen-King et al. |
| 9,465,126 | B2 | 10/2016 | Lewis et al. |
| 9,478,937 | B1 | 10/2016 | Kupershmidt et al. |
| 9,507,030 | B2 | 11/2016 | Godfrey |
| 9,512,711 | B2 | 12/2016 | Sobolewski et al. |
| 9,523,790 | B1 | 12/2016 | Valishin |
| 9,541,425 | B2 | 1/2017 | Farhadiroushan et al. |
| 9,557,195 | B2 | 1/2017 | Barfoot et al. |
| 9,561,812 | B2 | 2/2017 | Godfrey |
| 9,575,196 | B2 | 2/2017 | Ji et al. |
| 9,594,002 | B2 | 3/2017 | Godfrey et al. |
| 9,599,489 | B2 | 3/2017 | Nash et al. |
| 9,605,537 | B2 | 3/2017 | Hull et al. |
| 9,606,250 | B2 | 3/2017 | Hull et al. |
| 9,625,348 | B2 | 4/2017 | Hill et al. |
| 9,631,972 | B2 | 4/2017 | Hill et al. |
| 9,651,474 | B2 | 5/2017 | Farhadiroushan et al. |
| 9,651,709 | B2 | 5/2017 | Jaaskelainen |
| 9,677,956 | B2 | 6/2017 | Hill et al. |
| 9,702,244 | B2 | 7/2017 | Willis et al. |
| 9,719,846 | B2 | 8/2017 | Ellmauthaler et al. |
| 9,733,120 | B2 | 8/2017 | Stokely et al. |
| 9,739,645 | B2 | 8/2017 | Hill et al. |
| 9,746,393 | B2 | 8/2017 | Godfrey |
| 9,759,824 | B2 | 9/2017 | Lumens et al. |
| 9,766,371 | B2 | 9/2017 | Barfoot et al. |
| 9,778,097 | B2 | 10/2017 | McEwen-King |
| 9,784,642 | B2 | 10/2017 | Strong et al. |
| 9,797,239 | B2 | 10/2017 | Godfrey |
| 9,810,809 | B2 | 11/2017 | Farhadiroushan et al. |
| 9,816,853 | B2 | 11/2017 | Crickmore et al. |
| 9,823,114 | B2 | 11/2017 | Farhadiroushan et al. |
| 9,829,368 | B2 | 11/2017 | Kutlik et al. |
| 9,850,749 | B2 | 12/2017 | Finfer et al. |
| 9,869,795 | B2 | 1/2018 | Jaaskelainen |
| 9,880,047 | B2 | 1/2018 | Martin et al. |
| 9,896,929 | B2 | 2/2018 | Farhadiroushan et al. |
| 9,909,903 | B2 | 3/2018 | Lewis et al. |
| 9,945,215 | B2 | 4/2018 | Godfrey |

(56) References Cited

U.S. PATENT DOCUMENTS

| | | |
|---|---|---|
| 9,945,979 B2 | 4/2018 | Stokely et al. |
| 9,983,293 B2 | 5/2018 | Farhadiroushan et al. |
| 9,989,388 B2 | 6/2018 | Farhadiroushan et al. |
| 10,018,036 B2 | 7/2018 | Ellmauthaler et al. |
| 10,031,044 B2 | 7/2018 | Kumar et al. |
| 10,067,030 B2 | 9/2018 | Hartog et al. |
| 10,101,182 B2 | 10/2018 | Barfoot |
| 10,120,104 B2 | 11/2018 | Roy et al. |
| 10,139,268 B2 | 11/2018 | Nunes et al. |
| 10,145,821 B2 | 12/2018 | Farhadiroushan et al. |
| 10,151,626 B2 | 12/2018 | Godfrey et al. |
| 10,175,374 B2 | 1/2019 | Dusterhoft et al. |
| 10,180,515 B2 | 1/2019 | Ellmauthaler et al. |
| 10,197,693 B2 | 2/2019 | Kalyanraman et al. |
| 10,198,946 B2 | 2/2019 | Crickmore et al. |
| 10,215,017 B2 | 2/2019 | Hull et al. |
| 10,221,681 B2 | 3/2019 | McEwen-King et al. |
| 10,234,345 B2 | 3/2019 | Hull et al. |
| 10,247,584 B2 | 4/2019 | Crickmore et al. |
| 10,260,937 B2 | 4/2019 | Dankers et al. |
| 10,267,141 B2 | 4/2019 | Nunes et al. |
| 10,274,381 B2 | 4/2019 | Kulkarni et al. |
| 10,275,402 B2 | 4/2019 | Guerriero et al. |
| 10,281,341 B2 | 5/2019 | Hull et al. |
| 10,310,113 B2 | 6/2019 | Sun et al. |
| 10,317,262 B2 | 6/2019 | Kippersund et al. |
| 10,379,239 B2 | 8/2019 | Udengaard |
| 10,393,921 B2 | 8/2019 | Cuny et al. |
| 10,401,519 B2 | 9/2019 | Willis et al. |
| 10,416,328 B2 | 9/2019 | Walters et al. |
| 10,422,365 B2 | 9/2019 | Hull et al. |
| 10,422,901 B2 | 9/2019 | Walters et al. |
| 10,429,530 B2 | 10/2019 | Rickett et al. |
| 10,444,388 B2 | 10/2019 | Dusterhoft et al. |
| 10,444,391 B2 | 10/2019 | Ellmauthaler et al. |
| 10,444,393 B2 | 10/2019 | Cheng et al. |
| 10,458,224 B2 | 10/2019 | Dickenson et al. |
| 10,520,625 B2 | 12/2019 | Walters et al. |
| 10,578,757 B2 | 3/2020 | Dong et al. |
| 2001/0037883 A1 | 11/2001 | Veneruso et al. |
| 2002/0139929 A1 | 10/2002 | Mullins et al. |
| 2002/0195246 A1 | 12/2002 | Davidson |
| 2003/0010126 A1 | 1/2003 | Romanet et al. |
| 2003/0014199 A1 | 1/2003 | Toomey |
| 2003/0029241 A1 | 2/2003 | Mandal |
| 2004/0059505 A1 | 3/2004 | Gallagher |
| 2005/0100172 A1 | 5/2005 | Schliep et al. |
| 2005/0246111 A1 | 11/2005 | Gysling et al. |
| 2006/0165239 A1 | 7/2006 | Langner et al. |
| 2006/0165344 A1 | 7/2006 | Mendez et al. |
| 2007/0047867 A1 | 3/2007 | Goldner |
| 2007/0163780 A1 | 7/2007 | Onodera et al. |
| 2007/0199696 A1 | 8/2007 | Walford |
| 2007/0215345 A1 | 9/2007 | Lafferty et al. |
| 2007/0234789 A1 | 10/2007 | Glasbergen et al. |
| 2007/0247631 A1 | 10/2007 | Paulson |
| 2007/0253561 A1 | 11/2007 | Williams et al. |
| 2008/0137475 A1 | 6/2008 | Maisons |
| 2008/0154510 A1 | 6/2008 | Scott |
| 2008/0232748 A1 | 9/2008 | Nash |
| 2008/0314142 A1 | 12/2008 | Davies |
| 2009/0010104 A1 | 1/2009 | Leaney |
| 2009/0055098 A1 | 2/2009 | Mese et al. |
| 2009/0132183 A1 | 5/2009 | Hartog et al. |
| 2009/0202192 A1 | 8/2009 | Taverner et al. |
| 2009/0213692 A1 | 8/2009 | Martinez et al. |
| 2010/0163223 A1 | 7/2010 | Brown |
| 2010/0243241 A1 | 9/2010 | Hampton et al. |
| 2010/0258304 A1 | 10/2010 | Hegeman |
| 2010/0268489 A1* | 10/2010 | Lie ................... E21B 47/101 |
| | | 702/51 |
| 2011/0030467 A1 | 2/2011 | Bakulin |
| 2011/0042071 A1 | 2/2011 | Hsu et al. |
| 2011/0085415 A1 | 4/2011 | Morton et al. |
| 2011/0110191 A1 | 5/2011 | Williams-Stroud et al. |
| 2011/0139538 A1 | 6/2011 | Hill et al. |
| 2011/0149688 A1 | 6/2011 | Hill et al. |
| 2011/0188346 A1* | 8/2011 | Hull ..................... E21B 47/107 |
| | | 367/35 |
| 2011/0255077 A1 | 10/2011 | Rogers |
| 2011/0301882 A1 | 12/2011 | Andersen |
| 2011/0315369 A1 | 12/2011 | Holderman et al. |
| 2012/0020184 A1 | 1/2012 | Wilson et al. |
| 2012/0043079 A1 | 2/2012 | Wassouf et al. |
| 2012/0057432 A1 | 3/2012 | Hill et al. |
| 2012/0092960 A1* | 4/2012 | Gaston ................ E21B 47/101 |
| | | 367/35 |
| 2012/0096922 A1 | 4/2012 | Ellson |
| 2012/0111560 A1 | 5/2012 | Hill et al. |
| 2012/0137781 A1 | 6/2012 | Hill et al. |
| 2012/0152024 A1 | 6/2012 | Johansen |
| 2012/0257475 A1 | 10/2012 | Luscombe et al. |
| 2013/0139600 A1 | 6/2013 | McEwen-King et al. |
| 2013/0151203 A1 | 6/2013 | McEwen-King et al. |
| 2013/0166227 A1 | 6/2013 | Hermann et al. |
| 2013/0167628 A1 | 7/2013 | Hull et al. |
| 2013/0170519 A1 | 7/2013 | Alliot |
| 2013/0298665 A1 | 11/2013 | Minchau |
| 2013/0299165 A1 | 11/2013 | Crow |
| 2013/0319121 A1 | 12/2013 | Hill et al. |
| 2014/0025319 A1 | 1/2014 | Farhadiroushan et al. |
| 2014/0036627 A1* | 2/2014 | Hull ..................... G01V 1/001 |
| | | 367/26 |
| 2014/0036628 A1 | 2/2014 | Hill et al. |
| 2014/0069173 A1 | 3/2014 | Roy et al. |
| 2014/0150523 A1 | 6/2014 | Stokely et al. |
| 2014/0150548 A1 | 6/2014 | Childers et al. |
| 2014/0204368 A1 | 7/2014 | Lewis et al. |
| 2014/0216151 A1 | 8/2014 | Godfrey et al. |
| 2014/0334253 A1 | 11/2014 | Lumens et al. |
| 2014/0362668 A1 | 12/2014 | McEwen-King |
| 2015/0000415 A1 | 1/2015 | Kelley |
| 2015/0085610 A1 | 3/2015 | Raum et al. |
| 2015/0144333 A1 | 5/2015 | Lee et al. |
| 2015/0146759 A1 | 5/2015 | Johnston |
| 2015/0235544 A1 | 8/2015 | Hemandez et al. |
| 2015/0308909 A1 | 10/2015 | Carneal et al. |
| 2016/0123798 A1 | 5/2016 | Godfrey et al. |
| 2016/0138386 A1 | 5/2016 | Stokely et al. |
| 2016/0146962 A1 | 5/2016 | Hayward |
| 2016/0223389 A1 | 8/2016 | Farhadiroushan et al. |
| 2016/0259079 A1 | 9/2016 | Wilson et al. |
| 2016/0265345 A1 | 9/2016 | In T Panhuis et al. |
| 2016/0312552 A1 | 10/2016 | Early et al. |
| 2016/0312604 A1 | 10/2016 | Hull et al. |
| 2016/0327419 A1 | 11/2016 | Hellevang et al. |
| 2016/0356665 A1 | 12/2016 | Felemban et al. |
| 2016/0369607 A1 | 12/2016 | Roy et al. |
| 2017/0010385 A1 | 1/2017 | Englich et al. |
| 2017/0016312 A1 | 1/2017 | Clarke et al. |
| 2017/0039826 A1 | 2/2017 | Cojocaur |
| 2017/0045410 A1 | 2/2017 | Crickmore et al. |
| 2017/0052049 A1 | 2/2017 | Crickmore et al. |
| 2017/0052050 A1 | 2/2017 | Crickmore et al. |
| 2017/0074998 A1 | 3/2017 | McColpin et al. |
| 2017/0074999 A1 | 3/2017 | Walters et al. |
| 2017/0075001 A1 | 3/2017 | McColpin et al. |
| 2017/0075002 A1 | 3/2017 | Ranjan et al. |
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0082766 A1 | 3/2017 | Milne et al. |
| 2017/0119255 A1 | 5/2017 | Mahajan et al. |
| 2017/0123089 A1 | 5/2017 | Walters et al. |
| 2017/0153154 A1 | 6/2017 | Hull et al. |
| 2017/0205253 A1 | 7/2017 | Handerek |
| 2017/0241830 A1 | 8/2017 | Jaaskelainen |
| 2017/0241831 A1 | 8/2017 | Jaaskelainen |
| 2017/0292862 A1 | 10/2017 | Godfrey |
| 2017/0315261 A1 | 11/2017 | Bartling et al. |
| 2017/0342814 A1 | 11/2017 | Krueger et al. |
| 2017/0343389 A1 | 11/2017 | Parker et al. |
| 2017/0350234 A1 | 12/2017 | Xia et al. |
| 2017/0363756 A1 | 12/2017 | El Allouche et al. |

(56) References Cited

U.S. PATENT DOCUMENTS

| | | |
|---|---|---|
| 2017/0371057 A1 | 12/2017 | Mateeva et al. |
| 2018/0024260 A1 | 1/2018 | Hornman et al. |
| 2018/0031413 A1 | 2/2018 | Stokely et al. |
| 2018/0045543 A1 | 2/2018 | Farhadiroushan et al. |
| 2018/0045768 A1 | 2/2018 | Godfrey et al. |
| 2018/0058196 A1 | 3/2018 | Jaaskelainen et al. |
| 2018/0066490 A1 | 3/2018 | Kjos |
| 2018/0087372 A1 | 3/2018 | Stokely et al. |
| 2018/0094952 A1 | 4/2018 | Handerek |
| 2018/0112519 A1 | 4/2018 | Duan et al. |
| 2018/0112523 A1 | 4/2018 | Yang et al. |
| 2018/0136354 A1 | 5/2018 | Haldorsen |
| 2018/0172860 A1 | 6/2018 | Wilson et al. |
| 2018/0180658 A1 | 6/2018 | Godfrey |
| 2018/0203144 A1 | 7/2018 | Karrenbach et al. |
| 2018/0222498 A1 | 8/2018 | Kelley |
| 2018/0224572 A1 | 8/2018 | Farhadiroushan et al. |
| 2018/0230797 A1 | 8/2018 | Seshadri et al. |
| 2018/0231658 A1 | 8/2018 | Jalilian et al. |
| 2018/0238167 A1* | 8/2018 | Ravi ................... E21B 33/14 |
| 2018/0252097 A1 | 9/2018 | Skinner et al. |
| 2018/0259662 A1 | 9/2018 | Srinivasan |
| 2018/0266854 A1 | 9/2018 | Moore et al. |
| 2018/0267201 A1 | 9/2018 | Lewis |
| 2018/0284752 A1 | 10/2018 | Cella et al. |
| 2018/0292569 A1 | 10/2018 | LeBlanc et al. |
| 2018/0320827 A1 | 11/2018 | Hull et al. |
| 2018/0340801 A1 | 11/2018 | Kelley et al. |
| 2018/0342156 A1 | 11/2018 | Martin et al. |
| 2018/0354534 A1 | 12/2018 | Cole |
| 2018/0356210 A1 | 12/2018 | Moore et al. |
| 2019/0003499 A1 | 1/2019 | Logan et al. |
| 2019/0003903 A1 | 1/2019 | Godfrey |
| 2019/0025094 A1 | 1/2019 | Lewis et al. |
| 2019/0064030 A1 | 2/2019 | Sundermann |
| 2019/0072379 A1 | 3/2019 | Jalilian et al. |
| 2019/0113641 A1 | 4/2019 | Fang et al. |
| 2019/0120044 A1 | 4/2019 | Langnes et al. |
| 2019/0137045 A1 | 5/2019 | Jalilian et al. |
| 2019/0169985 A1 | 6/2019 | Dickenson et al. |
| 2019/0186958 A1 | 6/2019 | Godfrey |
| 2019/0197846 A1 | 6/2019 | Englund |
| 2019/0225250 A1 | 7/2019 | Esprey et al. |
| 2019/0257169 A1 | 8/2019 | Grimsbo et al. |
| 2019/0257699 A1 | 8/2019 | Handerek et al. |
| 2019/0323863 A1 | 10/2019 | Shatalin et al. |
| 2019/0324444 A1 | 10/2019 | Cella et al. |
| 2019/0331819 A1 | 10/2019 | Wu et al. |
| 2019/0353814 A1 | 11/2019 | Cha et al. |
| 2019/0390546 A1 | 12/2019 | Langnes et al. |
| 2020/0018149 A1 | 1/2020 | Luo et al. |
| 2020/0024942 A1 | 1/2020 | Lolla et al. |
| 2020/0032639 A1 | 1/2020 | Langnes et al. |
| 2020/0032645 A1 | 1/2020 | LeBlanc et al. |
| 2020/0056907 A1 | 2/2020 | Godfrey |
| 2020/0057220 A1 | 2/2020 | Hull et al. |
| 2020/0070862 A1 | 3/2020 | Bilodeau et al. |
| 2020/0081145 A1 | 3/2020 | Padhi et al. |
| 2020/0102821 A1 | 4/2020 | Willis et al. |
| 2020/0124489 A1 | 4/2020 | Godfrey |
| 2020/0131900 A1 | 4/2020 | Leblanc et al. |
| 2020/0158594 A1 | 5/2020 | Dankers et al. |
| 2020/0172130 A1 | 6/2020 | Esprey |
| 2020/0173273 A1 | 6/2020 | Thiruvenkatanathan |
| 2020/0173818 A1 | 6/2020 | Handerek et al. |
| 2020/0182047 A1 | 6/2020 | Langnes et al. |
| 2020/0190971 A1 | 6/2020 | Thiruvenkatanathan |
| 2020/0200000 A1 | 6/2020 | Langnes et al. |
| 2020/0200943 A1 | 6/2020 | Adeyemi et al. |
| 2020/0233107 A1 | 7/2020 | Constantinou et al. |
| 2020/0256834 A1 | 8/2020 | Langnes et al. |

FOREIGN PATENT DOCUMENTS

| | | |
|---|---|---|
| CA | 2866274 A1 | 3/2016 |
| CN | 101769442 A | 7/2010 |
| CN | 102226390 A | 10/2011 |
| CN | 203561437 U | 4/2014 |
| CN | 105135219 A | 12/2015 |
| CN | 105676267 A | 6/2016 |
| CN | 205746047 U | 11/2016 |
| CN | 108918405 A | 11/2018 |
| CN | 109000157 A | 12/2018 |
| CN | 110231409 A | 9/2019 |
| CN | 209858753 U | 12/2019 |
| EP | 2418466 A2 | 2/2012 |
| EP | 3006908 A1 | 4/2016 |
| EP | 3032441 A2 | 6/2016 |
| EP | 3073051 A1 | 9/2016 |
| EP | 3440314 A2 | 2/2019 |
| GB | 1299843 A | 12/1972 |
| GB | 2354782 A | 4/2001 |
| GB | 2359834 A | 9/2001 |
| GB | 2522061 A | 7/2015 |
| GB | 2555550 A | 5/2018 |
| GB | 2555637 A | 5/2018 |
| JP | 5518424 B2 | 6/2014 |
| WO | 97/21116 A1 | 6/1997 |
| WO | 2004031738 A1 | 4/2004 |
| WO | 2007024763 A2 | 3/2007 |
| WO | 2008147953 A1 | 12/2008 |
| WO | 2009/048340 A2 | 4/2009 |
| WO | 2009086279 A2 | 7/2009 |
| WO | 2009109747 A1 | 9/2009 |
| WO | 2010099484 A2 | 9/2010 |
| WO | 2012011831 A1 | 1/2012 |
| WO | 2013114135 A2 | 8/2013 |
| WO | 2015011394 A1 | 1/2015 |
| WO | 2015025216 A2 | 2/2015 |
| WO | 2015060981 A1 | 4/2015 |
| WO | 2015170113 A1 | 11/2015 |
| WO | 2015170116 A1 | 11/2015 |
| WO | 2016010550 A1 | 1/2016 |
| WO | 2016020654 A1 | 2/2016 |
| WO | 2016115030 A1 | 7/2016 |
| WO | 2016207341 A1 | 12/2016 |
| WO | 2017009606 A1 | 1/2017 |
| WO | 2017064472 A1 | 4/2017 |
| WO | 2017078536 A1 | 5/2017 |
| WO | 2017109467 A1 | 6/2017 |
| WO | 2017156339 A1 | 9/2017 |
| WO | 2017174746 A1 | 10/2017 |
| WO | 2017174750 A2 | 10/2017 |
| WO | 2017203271 A1 | 11/2017 |
| WO | 2017214729 A1 | 12/2017 |
| WO | 2018044309 A1 | 3/2018 |
| WO | 2018057029 A1 | 3/2018 |
| WO | 2018088994 A1 | 5/2018 |
| WO | 2018136050 A1 | 7/2018 |
| WO | 2018154275 A1 | 8/2018 |
| WO | 2018178279 A1 | 10/2018 |
| WO | 2018195661 A1 | 11/2018 |
| WO | 2019005050 A1 | 1/2019 |
| WO | 2019027466 A1 | 2/2019 |
| WO | 2019038401 A1 | 2/2019 |
| WO | 2019072899 A2 | 4/2019 |
| WO | 2019094140 A1 | 5/2019 |
| WO | 2019094474 A1 | 5/2019 |
| WO | 2019136556 A1 | 7/2019 |
| WO | 2019139564 A1 | 7/2019 |
| WO | 2020109426 A2 | 6/2020 |
| WO | 2020109427 A2 | 6/2020 |
| WO | 2020119957 A1 | 6/2020 |

OTHER PUBLICATIONS

European Search Report dated Dec. 4, 2019, for European Application No. 19198488.9 (4 p.).

Li, Meng, et al., "Current and Future Applications of Distributed Acoustic Sensing as a New Reservoir Geophysics Tool," The Open

(56) References Cited

OTHER PUBLICATIONS

Petroleum Engineering Journal, 2015, 8, (Suppl 1: M3) 272-281.
Ma, King, et al. "Deep Learning on Temporal-Spectral Data for Anomaly Detection," Department of Electrical and Computer Engineering, University of Calgary, Proc. of SPIE vol. 10190, 2017.
Martin, Shawn, "Can Oil Well Monitoring Systems Withstand Stimulation Treatments," Feb. 26, 2015, https://insights.globalspec.com/article/601/can-oil-well-monitoring-systems-withstand-stimulation-treatments [retrieved on Aug. 18, 2020].
Martinez, Roberto Jr., "Diagnosis of Fracture Flow Conditions With Acoustic Sensing," SPE Hydraulic Fracturing Technology Conference, Feb. 4-6, The Woodlands, Texas, US, Publication Date 2014.
Miller, Douglas E., et al., "Vertical Seismic Profiling Using a Fiber-optic Cable as a Distributed Acoustic Sensor," 74th EAGE Conference Exhibition incorporating SPE EUROPEC 2012, Copenhagen, Denmark, Jun. 4-7, 2012.
Mohd Daud, Farik, et al., "Successful Application of Ultrasound Technology to Detect Sand Producing Intervals in the Wellbore," International Petroleum Technology Conference, Nov. 15-17, 2011, Bangkok, Thailand, IPTC-14737-MS, https://doi.org/10.2523/IPTC-14737-MS.
Molenaar, Menno M., et al., "First Downhole Application of Distributed Acoustic Sensing for Hydraulic-Fracturing Monitoring and Diagnostics," SPE Drilling Completion, vol. 27, Is. 1, Mar. 2012, SPE-140561-PA, https://doi.org/10.2118/140561-PA.
Mullens, Stephen, et al., "Fiber-Optic Distributed Vibration Sensing Provides Technique for Detecting Sand Production," Offshore Technology Conference, May 3-6, 2010, Houston, Texas, US, OTC-20429-MS, https://doi.org/10.4043/20429-MS.
Naldrett, G., et al., "Production Monitoring Using Next-Generation Distributed Sensing Systems," Petrophysics, vol. 59, No. 4 (Aug. 2018); pp. 496-510; 16 Figures. DOI: 10.30632/PJV59V4-2018a5.
Paleja, Rakesh, el al., "Velocity Tracking for Flow Monitoring and Production Profiling Using Distributed Acoustic Sensing," SPE Annual Technical Conference and Exhibition, Sep. 28-30, 2015, Houston, Texas, US, SPE-174823-MS, https://doi.org/10.2118/174823-MS.
Roxar sand monitor, https://www.emerson.com/en-us/automation/roxar.
Roxar, "Sand Monitor, Non-intrusive acoustic sensor," Draft 1-120209, Sundheim-Madison Feb. 2009.
Schultz, Whitney H., "Time-Lapse Multicomponent Geophone and DAS VSP Processing and Analysis," Colorado School of Mines, Geo-Physics Department, 2019.
Silixa, "Fracture Monitoring," https://silixa.com/solutions/oil-and-gas-downhole/frac-services/fracture-monitoring/.
Silixa, "Well Integrity," https://silixa.com/solutions/oil-and-gas-downhole/permanent-reservoir-and-well-surveillance/well-integrity/.
Silkina, Tatiana, "Application of Distributed Acoustic Sensing to Flow Regime Classification," Natural Gas Technology, Norwegian University of Science and Technology, Jun. 2014.
Stokely, Christopher L., "Acoustics-Based Flow Monitoring During Hydraulic Fracturing," SPE-179151-MS, Society of Petroleum Engineers, SPE Hydraulic Fracturing Technology Conference, Feb. 9-11, 2016, The Woodlands, Texas, USA, https://doi.org/102118/179151-MS.
Susilo, Yoliandri, et al., "Significant Increase in Sand Control Reliability of Open Hole Gravel Pack Completions in ACG Field—Azerbaijan," SPE European Formation Damage Conference Exhibition, Jun. 5-7, 2013, Noordwijk, NL, SPE-165206-MS, https://doi.org/10.2118/165206-MS.
Tiffin, David L., et al., "Drawdown Guidelines for Sand Control Completions", SPE International, SPE 84495, Oct. 5, 2003 (Oct. 5, 2005), pp. 1-10, XP002361435.
van der Horst, Juun, et al., "Fibre Optic Sensing for Improved Wellbore Production Surveillance," International Petroleum Technology Conference, Jan. 19-22, 2014, Doha, Qatar, IPTC-17528-MS, https://doi.org/10.2523/IPTG-17528-MS.

Wang, Fang, et al., "Pipeline Leak Detection by Using Time-Domain Statistical Features," IEEE Sensors Journal, vol. 17, No. 19, Oct. 2017.
Wang, Kai, et al., "Vibration Sensor Approaches for the Monitoring of Sand Production in Bohai Bay," Hindawi Publishing Corporation, Shock and Vibration, vol. 2015, Article ID 591780, http://dx.doi.org/10.1155/2015/591780.
World first installation of a fiber optic acoustic sensor for reservoir monitoring, Oil and Gas Product News, Oct. 30, 2009.
WorldOil.com, "Adelous unveils distributed acoustic sensor solution for upstream oil gas," May 28, 2015. https://www.worldoil.com/news/2015/5/28/adelos-unveils-distributed-acoustic-sensor-solution-for-upstrearn-oil-gas.
Xiao, J., et al., "Dynamic Water Injection Profiling in Intelligent Weis Using Distributed Acoustic Sensor with Multimode Optical Fibers," SPE Annual Technical Conference and Exhibition, Sep. 28-30, 2015, Houston, Texas, US, SPE-174865-MS, https://doi.org/10.2118/174865-MS.
Xiao, J.J., et al., "Intelligent Distributed Acoustic Sensing for In-well Monitoring," SPE Saudi Arabia Section Technical Symposium and Exhibition, Apr. 21-24, 2014, Ai-Khobar, SA, SPE-172197-MS, https://doi.org/10.2118/172197-MS.
Williams, J., "Distributed acoustic sensing for pipeline monitoring," Pipeline and Gas Journal Jul. 2012, vol. 239 No. 7.
Partial International Search Report Search Report dated Oct. 20, 2020, PCT Application No. PCT/EP2020/051814.
Partial International Search Report Search Report dated Oct. 16, 2020, PCT Application No. PCT/EP2020/051817.
International Search Report and Written Opinion dated Oct. 5, 2017, PCT Application No. PCT/EP2017/058300.
International Preliminary Report on Patentability dated Oct. 18, 2018, PCT Application No. PCT/EP2017/058300.
Intention to Grant dated Dec. 12, 2019, EP Application No. 17715935.7.
Decision to Grant dated May 8, 2020, EP Application No. 17715935.7.
Office Action dated Dec. 29, 2019, U.S. Appl. No. 16/563,544, filed Sep. 16, 2019.
Notice of Allowance dated Apr. 22, 2020, U.S. Appl. No. 16/563,544, filed Sep. 16, 2019.
European Search Report dated Aug. 10, 2020, EP Application No. 20170700.7.
International Search Report and Written Opinion dated Sep. 22, 2017, PCT Application No. PCT/EP2017/058292.
International Preliminary Report on Patentability dated Oct. 18, 2018, PCT Application No. PCT/EP2017/058292.
Office Action dated Dec. 4, 2019, U.S. Appl. No. 16/563,689, filed Sep. 6, 2019.
Notice of Allowance dated May 20, 2020, U.S. Appl. No. 16/563,689, filed Sep. 6, 2019.
Corrected Notice of Allowability dated Jun. 19, 2020, U.S. Appl. No. 16/563,689, filed Sep. 6, 2019.
European Search Report dated Apr. 22, 2020, for European Application No. 20154638.9.
International Preliminary Report on Patentability dated Oct. 10, 2019, PCT Application No. PCT/EP2018/058174.
European Article 94(3) Examination Report dated Jan. 15, 2020, for European Application No. 18714513.1.
European Article 94(3) Examination Report dated Jul. 29, 2020, for European Application No. 18714513.1.
European Article 94(3) Examination Report dated Feb. 3, 2020, for European Application No. 19198488.9.
Intention to Grant dated Aug. 10, 2020, for European Application No. 19198488.9.
Eurasian Office Action dated Sep. 3, 2020, for Eurasian Application No. 201992243/31.
International Search Report and Written Opinion dated Nov. 28, 2018, PCT Application No. PCT/EP2018/072811.
International Preliminary Report on Patentability dated Mar. 5, 2020, PCT Application No. PCT/EP2018/072811.
International Search Report and Written Opinion dated Feb. 14, 2020, PCT Application No. PCT/EP2019/057149.

(56) References Cited

OTHER PUBLICATIONS

Office Action dated Mar. 4, 2020, U.S. Appl. No. 16/710,237, filed Dec. 11, 2019.
International Search Report and Written Opinion dated Jun. 4, 2019, PCT Application No. PCT/EP2018/077568.
International Preliminary Report on Patentability dated Apr. 23, 2020, PCT Application No. PCT/EP2018/077568.
International Search Report and Written Opinion dated Jul. 9, 2020, PCT Application No. PCT/EP2018/082985.
International Search Report and Written Opinion dated Jul. 9, 2020, PCT Application No. PCT/EP2019/082808.
Office Action dated Feb. 24, 2020, U.S. Appl. No. 16/698,335, filed Nov. 11, 2019.
Final Office Action dated Jun. 24, 2020, U.S. Appl. No. 16/698,335, filed Nov. 11, 2019.
Advisory Action dated Aug. 25, 2020, U.S. Appl. No. 16/698,335, filed Nov. 11, 2019.
International Search Report and Written Opinion dated Jan. 27, 2020, PCT Application No. PCT/EP2019/056425.
International Search Report and Written Opinion dated Feb. 28, 2020, PCT Application No. PCT/IB2019/055355.
International Search Report and Written Opinion dated Jun. 16, 2020, PCT Application No. PCT/EP2019/075385.
International Search Report and Written Opinion dated Jun. 16, 2020, PCT Application No. PCT/EP2019/075378.
International Search Report and Written Opinion dated Jun. 17, 2020, PCT Application No. PCT/US2019/046759.
International Search Report and Written Opinion dated May 12, 2020, PCT Application No. PCT/EP2019/072891.
International Search Report and Written Opinion dated Jul. 9, 2020, PCT Application No. PCT/EP2019/078195.
International Search Report and Written Opinion dated Jun. 16, 2020, PCT Application No. PCT/EP2019/075387.
International Search Report and Written Opinion dated Jun. 16, 2020, PCT Application No. PCT/EP2019/075382.
Partial International Search Report Search Report dated Sep. 10, 2020, PCT Application No. PCT/EP2019/085454.
International Search Report and Written Opinion dated Jul. 9, 2020, PCT Application No. PCT/EP2019/078197.
International Search Report and Written Opinion dated May 29, 2020, PCT Application No. PCT/EP2019/082809.
Office Action dated Mar. 12, 2020, U.S. Appl. No. 16/698,407, filed Nov. 27, 2019.
Final Office Action dated Jun. 30, 2020, U.S. Appl. No. 16/698,407, filed Nov. 27, 2019.
Examination Report dated Jul. 15, 2020, GCC Application No. GC 2019-38726.
International Search Report and Written Opinion dated Jul. 24, 2020, PCT Application No. PCT/EP2019/081542.
International Search Report and Written Opinion dated Jul. 24, 2020, PCT Application No. PCT/EP2019/081545.
Abdelgaward, Ahemd, "Distributed Sand Monitoring Framework Using Wireless Sensor Networks," School of Engineering Technology, Central Michigan University, Mount Pleasant, MI 48859, US, Oct. 2013, vol. 1 Is. 1, pp. 1-10.
Abukhamsin, Ahmed Yasin, et al., "In Flow Profiling and Production Optimization in Smart Wells Using Di Stri But Ed Acoustic and Temperature Measurements," Jun. 1, 2017 (Jun. 1, 2017), XP055604495, Retrieved from the Internet: URL: https://pangea.stanford.edu/ERE/pdf/pereports/PhD/Abukhamsin2016.pdf [retrieved on Jul. 11, 2019] paragraphs [0001], [0002], [0004].
Bakku, Sudhish K, et al., "Vertical Seismic Profiling Using Distributed Acoustic Sensing in a Hydrofrac Treatment Well," SEG Technical Program Expanded Abstracts Denver 2014 ISSN (print): 1052-3812, ISSN (online): 1949-4645, https://doi.org/10.1190/segam2014-1559.1.
Broesch, James "Digital Signal Processing: Instant Access," Chapter 7, www.newnespress.com.
Brown, Gerald K., "External Acoustic Sensors and Instruments for the Detection of Sand in Oil and Gas Wells," Offshore Technology Conference, May 5-8, 1997, Houston, Texas, US, OTC-8478-MS, https://doi.org/10.4043/8478-MS.
Brown, Gerald K., et al., "Solids and Sand Monitoring—An Overview," CORROSION 2000, Mar. 26-31, Orlando, Florida, US, NACE International, NACE-00091.
Cannon, Robert Thayer, et al., "Distributed Acoustic Sensing: State of the Art," SPE Digital Energy Conference, Mar. 5-7, 2013, The Woodlands, Texas, US, SPE-163688-MS, https://doi.org/10.2118/163688-MS.
Chen, Jianyou, et al., "Distributed acoustic sensing coupling noise removal based on sparse optimization," Society of Exploration Geophysicists and American Association of Petroleum Geologists, vol. 7, Issue 2, May 2019, pp. 1M-T563, ISSN (print): 2324-8858, ISSN (online): 2324-8866, https://doi.org/10.1190/INT-2018-0080.1.
Chhantyal, Khim et al., "Upstream Ultrasonic Level Based Soft Sensing of Volumetric Flow of Non-Newtonian Fluids in Open Venturi Channels," IEEE Sensors Journal, vol. 18, No. 12, Jun. 15, 2018.
ClampOn DSP-06 Particle Monitor, Aug. 2009.
ClampOn SandQ® Monitor, Aug. 2014.
Conway, Chris, et al., "An introduction to fiber optic Intelligent Distributed Acoustic Sensing (iDAS) technology for power industry applications," 9th International Conference on Insulated Power Cables, Jicable15—Versailles Jun. 21-25, 2015, A3.4.
Correa, Julia, et al., "3D vertical seismic profile acquired with distributed acoustic sensing on tubing installation: A case study from the CO2CRC Otway Project," Interpretation—a Journal of Subsurface Characterization, 7(1), ISSN 2324-8858, Feb. 1, 2019, DOI 10.1190/INT-2018-0086.1, https://escholarship.org/uc/item/2br8g398.
Finfer, D.C., et al., "Borehole Flow Monitoring using a Non-intrusive Passive Distributed Acoustic Sensing (DAS)," Society of Petroleum Engineers, SPE-170844-MS, SPE Annual Technical Conference and Exhibition held in Amsterdam, The Netherlands, Oct. 27-29, 2014.
Gardner, Neil, et al., "Distributed Fiber-Optic Technologies Drive New Intervention Applications," SPE JPT-7975, vol. 67 | Issue: 1, Jan. 1, 2015.
Hill, David, Permanent real-time full wellbore flow monitoring using distributed fiber-optic sensing, OptaSense, 2015.
Hofman, Joachim, et al., "Analysis of the acoustic response in water and sand of different fiber optic sensing cables," SPIE Sensing Technology + Applications, 2015, Baltimore, Maryland, U.S., Proceedings vol. 9491, Sensors for Extreme Harsh Environments II; 94910E (2015) https://doi.org/10.1117/12.2178282.
Hill, John William, et al., "Well-Integrity Monitoring and Analysis Using Distributed Fiber-Optic Acoustic Sensors," IADC/SPE Drilling Conference and Exhibition, Feb. 2-4, 2010, New Orleans, Louisiana, US, SPE-128304-MS, itps://doi.org/10.2118/128304-MS.
Isensys, "Sand Alert—Fixed and Portable Sand Monitoring," Isensys LLP, Sep. 2016, www.isensys.co.uk.
Johannessen, Kjetil, et al., "Distributed Acoustic Sensing—A New Way of Listening to Your Well/Reservoir," SPE Intelligent Energy International, Mar. 27-29, 2012, Utrecht, NL, SPE-149602-MS, https://doi.org/10.2118/149602-MS.

\* cited by examiner und
WELL AND OVERBURDEN MONITORING USING DISTRIBUTED ACOUSTIC SENSORS

CROSS-REFERENCE TO RELATED APPLICATIONS

This application is a continuation of International Application No. PCT/EP2018/058174 filed Mar. 29, 2018 and entitled "Well and Overburden Monitoring Using Distributed Acoustic Sensors," which claims priority to U.S. Provisional Application No. 62/479,873 filed Mar. 31, 2017 and entitled "Well and Overburden Monitoring Using Distributed Acoustic Sensors," both of which are hereby incorporated herein by reference in their entirety for all purposes.

BACKGROUND

Within a hydrocarbon production well, various fluids such as hydrocarbons, water, gas, and the like can be produced from the formation into the wellbore. The production of the fluid can result in the movement of the fluids in various downhole regions, including within the subterranean formation, from the formation into the wellbore, and within the wellbore itself.

BRIEF SUMMARY OF THE DISCLOSURE

In an embodiment, a method of detecting a leak event within a wellbore comprises inducing a pressure differential within a wellbore comprising a fluid, obtaining a sample data set while inducing the pressure differential, determining a plurality of frequency domain features of the sample data set, determining a presence of a leak event at one or more depths within the wellbore based on determining that the plurality of frequency domain features match a leak event signature, correlating the leak event with the induced pressure differential, and determining a presence and location of a leak within the wellbore based on the presence of the leak event and the correlating of the leak event with the induced pressure differential. The sample data set is a sample of an acoustic signal originating within the wellbore, and the sample data set is representative of the acoustic signal across a frequency spectrum.

In an embodiment, a system for detecting a leak event within a wellbore comprises a receiver unit comprising a processor and a memory. The receiver unit is configured to receive a first signal from a sensor disposed in a wellbore. A processing application is stored in the memory, and the processing application, when executed on the processor, configures the processor to: receive the first signal from the sensor, wherein the signal comprises an indication of an acoustic signal received at one or more depths within the wellbore, receive a second signal comprising an indication of a pressure differential within the wellbore, determine a plurality of frequency domain features of the acoustic signal across the frequency spectrum, and compare the plurality of frequency domain features to a leak event signature, determine a presence of a leak event at one or more depths within the wellbore based on the plurality of frequency domain features matching the leak event signature at one or more depths in the wellbore, correlate the leak event with the induced pressure differential, determine a presence and location of a leak within the wellbore based on the presence of the leak event and the correlation of the leak event with the induced pressure differential, and generate an output indicative of the presence and location of the leak. The signal is indicative of the acoustic signal across a frequency spectrum.

In an embodiment, a method of detecting a leak in a wellbore comprises detecting a baseline condition within the wellbore. The wellbore comprises one or more tubular strings and one or more annuli disposed between at least one of: i) two adjacent tubular strings of the one or more tubular strings, ii) a tubular string of the one or more tubular strings and a formation, or iii) both i and ii. The method also includes inducing a pressure differential relative to the baseline condition within a first annuli of the one or more annuli, receiving an acoustic signal from one or more depths within the wellbore while inducing the pressure differential, detecting a flow condition within the wellbore based on a plurality of frequency domain features of the acoustic signal across the frequency spectrum, correlating the flow condition with the baseline condition and the pressure differential, determining a depth and of the flow condition and based on the correlating, and determining an annuli of the one or more annuli with the flow condition based on the correlating.

In an embodiment, a system for detecting a leak event within a wellbore comprises a receiver unit comprising a processor and a memory. The receiver unit is configured to receive a first signal from a sensor disposed in a wellbore. A processing application is stored in the memory, and the processing application, when executed on the processor, configures the processor to: receive the first signal from the sensor, wherein the signal comprises an indication of an acoustic signal received at one or more depths within the wellbore, receive a second signal comprising an indication of a pressure or flow within the wellbore, determine a plurality of frequency domain features of the acoustic signal across the frequency spectrum, compare the plurality of frequency domain features to an overburden event signature, determine a presence of an overburden event at one or more depths within the wellbore based on the plurality of frequency domain features matching the overburden event signature at one or more depths in the wellbore, correlate the overburden event with the pressure or flow, determine a presence and location of the overburden event within the wellbore based on the presence of the overburden event and the correlation of the overburden event with the pressure or flow, and generate an output indicative of the presence and location of the overburden event. The signal is indicative of the acoustic signal across a frequency spectrum.

These and other features will be more clearly understood from the following detailed description taken in conjunction with the accompanying drawings and claims.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
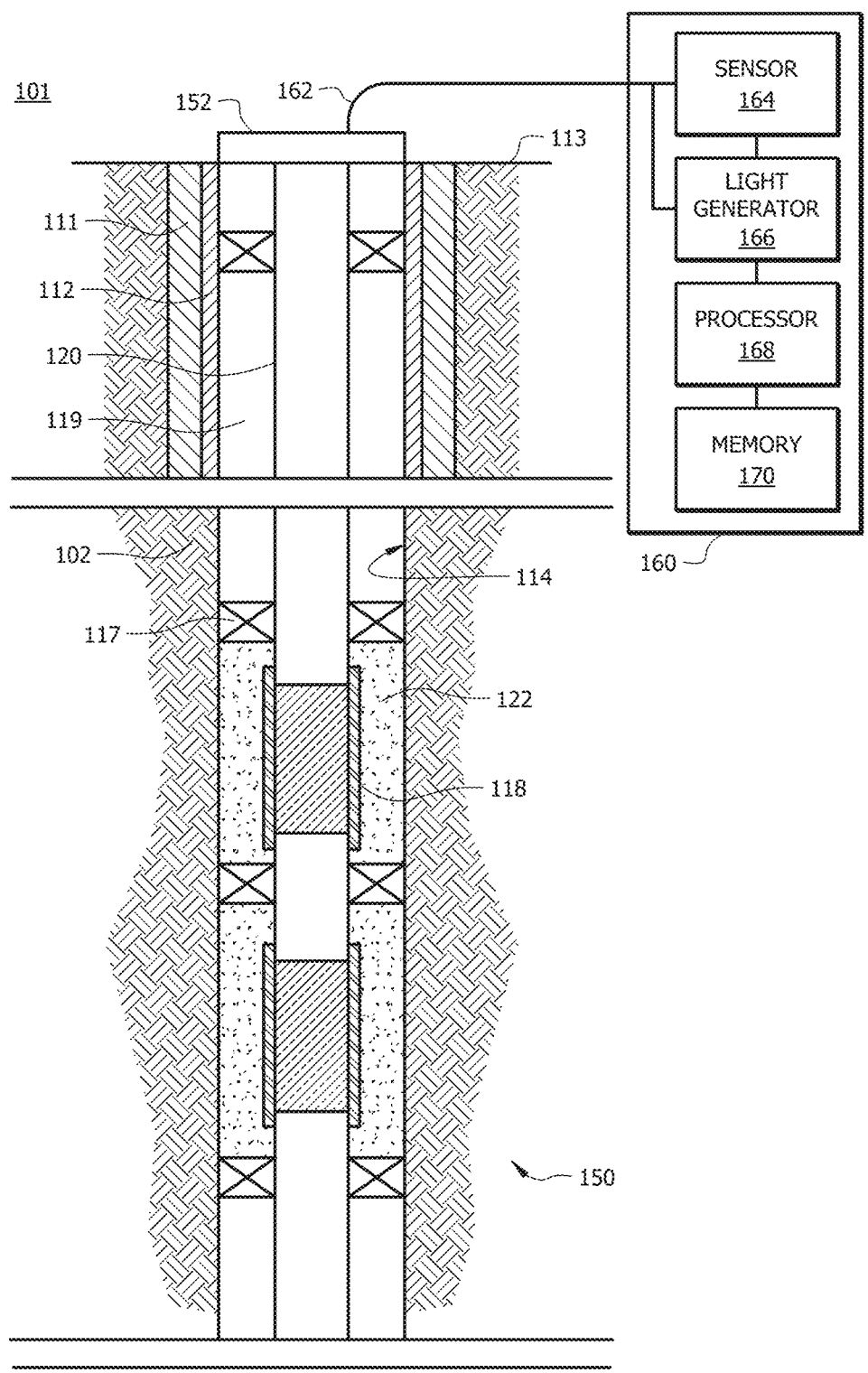
FIG. 1 is a schematic, cross-sectional illustration of a downhole wellbore environment according to an embodiment.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. Reference to inner or outer will be made for purposes of description with "in," "inner," or "inward" meaning towards the central longitudinal axis of the wellbore and/or wellbore tubular, and "out," "outer," or "outward" meaning towards the wellbore wall. As used herein, the term "longitudinal" or "longitudinally" refers to an axis substantially aligned with the central axis of the wellbore tubular, and "radial" or "radially" refer to a direction perpendicular to the longitudinal axis. The various characteristics mentioned above, as well as other features and characteristics described in more detail below, will be readily apparent to those skilled in the art with the aid of this disclosure upon reading the following detailed description of the embodiments, and by referring to the accompanying drawings.

Disclosed herein is a real time signal processing architecture that allows for the identification of various downhole events including leak detection, pressure source identification, flow path identification, and phase detection of a leaking fluid in the wellbore (within a casing, within an annulus, etc.), the formation (e.g., overburden monitoring, etc.), or moving between the formation and wellbore. As used herein, the term "real time" refers to a time that takes into account various communication and latency delays within a system, and can include actions taken within about ten seconds, within about thirty seconds, within about a minute, within about five minutes, or within about ten minutes of the action occurring. In general, zonal isolation and well integrity management are concerns not only from the standpoint of operational risk and improved production efficiencies but also from an environmental impact perspective. Leak detection techniques can include the use of temperature sensors, pressure sensors, casing collar locators, multi-finger calipers, spinners, and sometimes, density measurement tools deployed in well using intervention technologies, as well as other non-invasive evaluation/assessment techniques for detecting flow behind casing (e.g., temperature logging, ultrasonic imaging, oxygen activation (for detection of water flow behind casing) with neutrons, and the like).

While one or a combination of these tools may help provide a qualitative, and sometimes quantitative, estimates of fluid flow between the production tubing and the production casing, these methods suffer from being 'point' measurement tools (i.e., tools that can only transduce a single physical parameter at a certain discrete location/depth at any one instance in time). This means that the leaks may not be captured accurately or captured at all unless the tools are positioned at the right location at the right time and/or unless the leak is large enough to generate a transducable signal. This typically results in longer data acquisition times and limited representations, which can often impede decision making and support. None of these tools offer the capability to monitor the flow of hydrocarbons behind multiple barriers, for example, in the casing-casing annuli, and this presents a challenge in maintaining well integrity. Multi-finger calipers are also often used to investigate any diameter variations along the tubing but this process does not quantify the extent, rate, or phase of leaking fluid. This also only provides an indication of potential leak location based on mechanical assessment of the tubing.

As described in more detail herein, distributed fibre optic (DFO) sensors for well integrity assessment use the fibre to monitor properties along the length of a wellbore. Similarly, distributed temperature sensing systems (DTS) can be used to measure the temperature along the wellbore. The main advantage of these DFO sensors is that the measurement can be made along the entire length of the wellbore over long periods of time as the entire deployed fibre cable is the sensor. This can avoid the need to move the tool and aiding more economical operations. The full wellbore coverage would also enable studies of leak evolution through time and depth consequently enabling precise identification of when and where leaks occur, rather than piecing together the picture from various steps in the logging operation. The use of DTS for leak detection however, brings a few limitations including: 1) the use of thermal profiles alone for leak identification often results in inconclusive results, and 2) it is difficult to achieve controlled shut in versus flowing conditions outside of casing to compare and determine leak locations from baseline thermal profiles.

As disclosed herein, a new approach to well and overburden monitoring is described using Distributed Acoustic Sensors (DAS) as the primary data input. This type of system offers not only identification of leaks and fluid flow behind casing, but also enables categorization of these events in real time or near real time. A data processing architecture is also described that processes voluminous DAS data in near real time (e.g., within a second, within ten seconds, etc.) to identify and classify leaks and other "events" indicative of well barrier anomalies with a single fibre optic cable deployed in well. The data can also be used in conjunction with surface and peripheral sensor data to enable semi-quantitative assessments of leak rates.

As further disclosed herein, the DAS data can be used with additional sensor data such as surface gauge pressure data as the primary sensor inputs for determining in-well and near wellbore leaks. The processing methodology uses an event detection algorithm that detects and captures acoustic events that are then processed in real-time using a spectral descriptor framework for signature recognition and identification of leak. The outputs of the event detection algorithm can then be correlated in time with the additional sensor data (e.g., the surface pressure gauge measurements). The correlation of the signals can enable identification of: a pressure source, a location of a leak, a leak flow path, and/or a predominant phase of a leaking fluid.

The method may also allow for monitoring fluid leaks behind multiple barriers which are usually not detected using conventional leak detection diagnostics tools. This ability enables monitoring of hydrocarbon migration up pathways adjacent to wellbores to shallower zones (crossflow) and/or into well annuli, thereby enabling real time monitoring of fluid movements in the overburden and evaluating well barrier degradation mechanisms that can eventually lead to well collapses and zonal isolation device failures.

As described in more detail herein, the system comprises a DAS interrogator connected to the fibre optic cable deployed in the well. Various sensors (e.g., the distributed fibre optic acoustic sensors, etc.) can be used to obtain an acoustic sampling at various points along the wellbore. The acoustic sample can then be processed using signal processing architecture with various feature extraction techniques (e.g., spectral feature extraction techniques) to obtain a measure of one or more frequency domain features that enable selectively extracting the acoustic signals of interest from background noise and consequently aiding in improving the accuracy of the identification of the movement of fluids and/or solids (e.g., liquid ingress locations, gas influx locations, constricted fluid flow locations, etc.) in real time. As used herein, various frequency domain features can be obtained from the acoustic signal. In some contexts the frequency domain features can also be referred to as spectral features or spectral descriptors. The signal processing techniques described herein can also help to address the big-data problem through intelligent extraction of data (rather than crude decimation techniques) to considerably reduce real time data volumes at the collection and processing site (e.g., by over 100 times, over 500 times, or over 1000 times, or over 10,000 times reduction).

The acoustic signal can be obtained in a manner that allows for a signal to be obtained along the entire wellbore or a portion of interest. Fibre optic distributed acoustic sensors (DAS) capture acoustic signals resulting from downhole events such as gas influx, liquid influx, fluid flow past restrictions, and the like as well as other background acoustics as well. This mandates the need for a robust signal processing procedure that distinguishes acoustic signals resulting from events of interest from other noise sources to avoid false positives in the results. This in turn results in a need for a clearer understanding of the acoustic fingerprint of in-well event of interest (e.g., leak detection, etc.) in order to be able to segregate a noise resulting from an event of interest from other ambient acoustic background noise. As used herein, the resulting acoustic fingerprint of a particular event can also be referred to as a spectral signature, as described in more detail herein.

In terms of data processing and loads, DAS acquisition units produce large data volumes (typically around 1 TB/hour) creating complexities in data handling, data transfer, data processing and storage. There is currently no method of intelligently extracting useful information to reduce data volumes in real time for immediate decision support. This imposes complexity in real time data transmission to shore and data integration into existing IT platforms due to data bandwidth limitations and the data has to be stored in hard drives that are shipped back to shore for interpretation and analysis. In addition, this increases the interpretation turnaround time (typically a few weeks to months) before any remediation efforts can be taken resulting in deferred production.

The ability to identify various events in the wellbore may allow for various actions to be taken in response to the events. For example, a well can be shut in, production can be increased or decreased, and/or remedial measures can be taken in the wellbore, as appropriate based on the identified event(s). An effective response, when needed, benefits not just from a binary yes/no output of an identification of in-well events but also from a measure of relative amount of fluids (e.g., amount of gas influx, amount of fluid flow past a restriction, etc.) from each of the identified zones so that zones contributing the greatest fluid and/or solid amounts can be acted upon first to improve or optimize production. For example, when a leak is detected past a restriction, a relative flow rate of the leak may allow for an identification of the timing in working to plug the leak (e.g., small leaks may not need to be fixed, larger leaks may need to be fixed with a high priority, etc.).

As described herein, spectral descriptors can be used with DAS acoustic data processing in real time to provide various downhole surveillance applications. More specifically, the data processing techniques can be applied for various downhole fluid profiling such as fluid inflow/outflow detection, fluid phase segregation, well integrity monitoring, in-well leak detection (e.g., downhole casing and tubing leak detection, leaking fluid phase identification, etc.), annular fluid flow detection, overburden monitoring, fluid flow detection behind a casing, fluid induced hydraulic fracture detection in the overburden, and the like.

In addition to the use of DAS data, additional sensor data such as pressure sensors and/or flow sensors can be used to obtain data within the wellbore. As an example, a flow sensor or pressure sensor can be used to detect fluid flow within the wellbore and/or an annulus within the wellbore. The sensors can be used with controlled shut-in and/or flow conditions to correlate in time the resulting pressure and/or flow conditions with the processed DAS data. The resulting correlation can then be used to determine a presence and location of a leak.

Referring now to FIG. 1, an example of a wellbore operating environment 100 is shown. As will be described in more detail below, embodiments of completion assemblies comprising distributed acoustic sensor (DAS) system in accordance with the principles described herein can be positioned in environment 100.

As shown in FIG. 1, exemplary environment 100 includes a wellbore 114 traversing a subterranean formation 102, casing 112 lining at least a portion of wellbore 114, and a tubular 120 extending through wellbore 114 and casing 112. A plurality of spaced screen elements or assemblies 118 are provided along tubular 120. In addition, a plurality of spaced zonal isolation devices 117 and gravel packs 122 are provided between tubular 120 and the sidewall of wellbore 114. In some embodiments, the operating environment 100 includes a workover and/or drilling rig positioned at the surface and extending over the wellbore 114.

In general, the wellbore 114 can be drilled into the subterranean formation 102 using any suitable drilling technique. The wellbore 114 can extend substantially vertically from the earth's surface over a vertical wellbore portion, deviate from vertical relative to the earth's surface over a deviated wellbore portion, and/or transition to a horizontal wellbore portion. In general, all or portions of a wellbore may be vertical, deviated at any suitable angle, horizontal, and/or curved. In addition, the wellbore 114 can be a new wellbore, an existing wellbore, a straight wellbore, an extended reach wellbore, a sidetracked wellbore, a multi-lateral wellbore, and other types of wellbores for drilling and completing one or more production zones. As illustrated, the wellbore 114 includes a substantially vertical producing section 150, which is an open hole completion (e.g., casing 112 does not extend through producing section 150). Although section 150 is illustrated as a vertical and open hole portion of wellbore 114 in FIG. 1, embodiments disclosed herein can be employed in sections of wellbores having any orientation, and in open or cased sections of wellbores. The casing 112 extends into the wellbore 114 from the surface and is cemented within the wellbore 114 with cement 111.

Figure 3A:
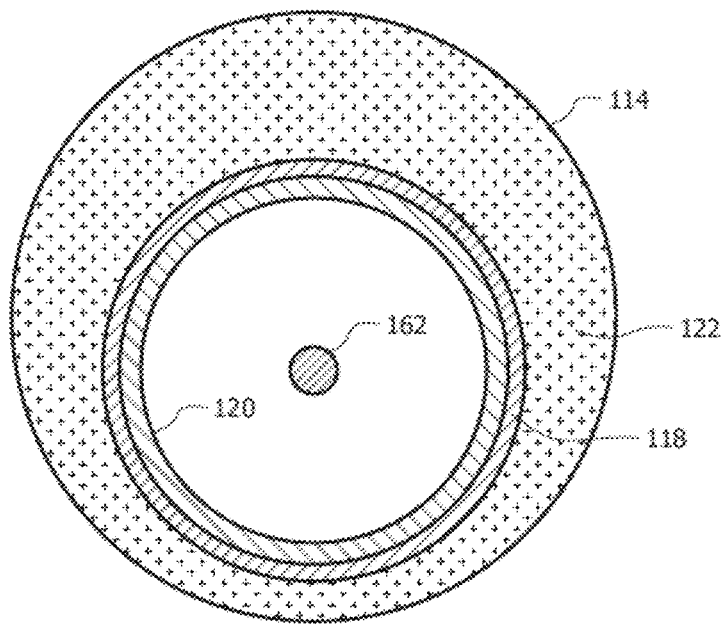
FIGS. 3A and 3B are a schematic, cross-sectional views of embodiments of a well with a wellbore tubular having an optical fibre associated therewith.
Figure 3B:
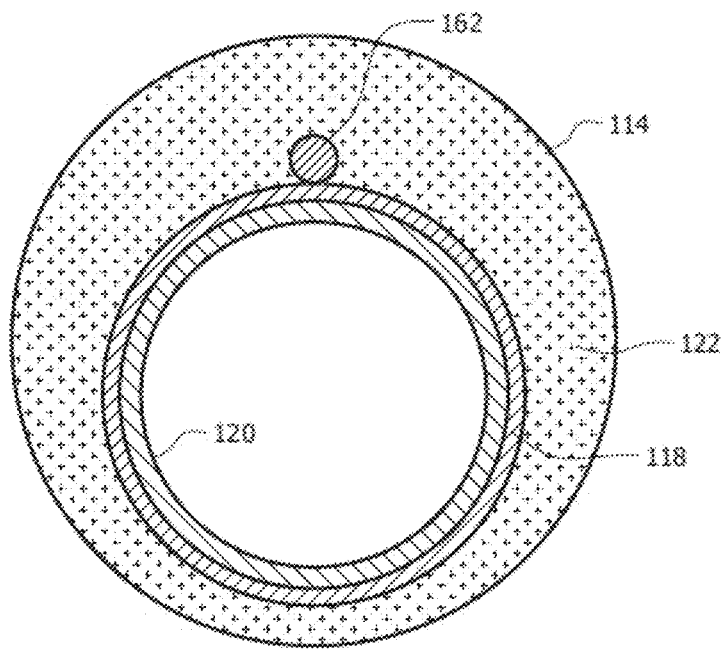

Tubular 120 can be lowered into wellbore 114 for performing an operation such as drilling, completion, workover, treatment, and/or production processes. In the embodiment shown in FIG. 1, the tubular 120 is a completion assembly string including a distributed acoustic sensor (DAS) sensor coupled thereto. However, in general, embodiments of the tubular 120 can function as a different type of structure in a wellbore including, without limitation, as a drill string, casing, liner, jointed tubing, and/or coiled tubing. Further, the tubular 120 may operate in any portion of the wellbore 114 (e.g., vertical, deviated, horizontal, and/or curved section of wellbore 114). Embodiments of DAS systems described herein can be coupled to the exterior of the tubular 120, or in some embodiments, disposed within an interior of the tubular 120, as shown in FIGS. 3A and 3B. When the DAS fibre is coupled to the exterior of the tubular 120, the DAS can be positioned within a control line, control channel, or recess in the tubular 120. In some embodiments, a sand control system can include an outer shroud to contain the tubular 120 and protect the system during installation. A control line or channel can be formed in the shroud and the DAS system can be placed in the control line or channel.

The tubular 120 extends from the surface to the producing zones and generally provides a conduit for fluids to travel from the formation 102 to the surface. A completion assembly including the tubular 120 can include a variety of other equipment or downhole tools to facilitate the production of the formation fluids from the production zones. For example, zonal isolation devices 117 are used to isolate the various zones within the wellbore 114. In this embodiment, each zonal isolation device 117 can be a packer (e.g., production packer, gravel pack packer, frac-pac packer, etc.). The zonal isolation devices 117 can be positioned between the screen assemblies 118, for example, to isolate different gravel pack zones or intervals along the wellbore 114 from each other. In general, the space between each pair of adjacent zonal isolation devices 117 defines a production interval.

The screen assemblies 118 provide sand control capability. In particular, the sand control screen elements 118, or other filter media associated with wellbore tubular 120, can be designed to allow fluids to flow therethrough but restrict and/or prevent particulate matter of sufficient size from flowing therethrough. In some embodiments, gravel packs 122 can be formed in the annulus 119 between the screen elements 118 (or tubular 120) and the sidewall of the wellbore 114 in an open hole completion. In general, the gravel packs 122 comprise relatively coarse granular material placed in the annulus to form a rough screen against the ingress of sand into the wellbore while also supporting the wellbore wall. The gravel pack 122 is optional and may not be present in all completions.

The fluid flowing into the tubular 120 may comprise more than one fluid component. Typical components include natural gas, oil, water, steam, and/or carbon dioxide. The relative proportions of these components can vary over time based on conditions within the formation 102 and the wellbore 114. Likewise, the composition of the fluid flowing into the tubular 120 sections throughout the length of the entire production string can vary significantly from section to section at any given time.

As fluid is produced into the wellbore 114 and into the completion assembly string, the flow of the various fluids into the wellbore 114 and/or through the wellbore 114 can create acoustic sounds that can be detected using the acoustic sensor such as the DAS system. Each type of event such as the different fluid flows and fluid flow locations can produce an acoustic signature with unique frequency domain features. For example, a leak representing fluid flow past a restriction, through an annulus, and/or through the formation can create unique sound profiles over a frequency domain such that each event may have a unique acoustic signature based on a plurality of frequency domain features.

In FIG. 1, the DAS comprises an optical fibre 162 based acoustic sensing system that uses the optical backscatter component of light injected into the optical fibre for detecting acoustic/vibration perturbations (e.g., dynamic strain) along the length of the fibre 162. The light can be generated by a light generator or source 166 such as a laser, which can generate light pulses. The optical fibre 162 acts as the sensor element with no addition transducers in the optical path, and measurements can be taken along the length of the entire optical fibre 162. The measurements can then be detected by an optical receiver such as sensor 164 and selectively filtered to obtain measurements from a given depth point or range, thereby providing for a distributed measurement that has selective data for a plurality of zones along the optical fibre 162 at any given time. In this manner, the optical fibre 162 effectively functions as a distributed array of acoustic sensors spread over the entire length of the optical fibre 162, which typically spans at least the production zone 150 of the wellbore 114, to detect downhole acoustic signals/vibration perturbations.

The light reflected back up the optical fibre 162 as a result of the backscatter can travel back to the source, where the signal can be collected by a sensor 164 and processed (e.g., using a processor 168). In general, the time the light takes to return to the collection point is proportional to the distance traveled along the optical fibre 162. The resulting backscattered light arising along the length of the optical fibre 162 can be used to characterize the environment around the optical fibre 162. The use of a controlled light source 166 (e.g., having a controlled spectral width and frequency) may allow the backscatter to be collected and any disturbances along the length of the optical fibre 162 to be analyzed. In general, any acoustic or dynamic strain disturbances along the length of the optical fibre 162 can result in a change in the properties of the backscattered light, allowing for a distributed measurement of both the acoustic magnitude, frequency and in some cases of the relative phase of the disturbance.

An acquisition device 160 can be coupled to one end of the optical fibre 162. As discussed herein, the light source 166 can generate the light (e.g., one or more light pulses), and the sensor 164 can collect and analyze the backscattered light returning up the optical fibre 162. In some contexts, the acquisition device 160 including the light source 166 and the sensor 164 can be referred to as an interrogator. In addition to the light source 166 and the sensor 164, the acquisition device 160 generally comprises a processor 168 in signal communication with the sensor 164 to perform various analysis steps described in more detail herein. While shown as being within the acquisition device 160, the processor can also be located outside of the acquisition device 160 including being located remotely from the acquisition device 160. The sensor 164 can be used to obtain data at various rates and may obtain data at a sufficient rate to detect the acoustic signals of interest with sufficient bandwidth. In an embodiment, depth resolution ranges of between about 1 meter and about 10 meters can be achieved.

While the system 100 described herein can be used with a DAS system to acquire an acoustic signal for a location or depth range in the wellbore 114, in general, any suitable acoustic signal acquisition system can be used with the processing steps disclosed herein. For example, various microphones or other sensors can be used to provide an acoustic signal at a given location based on the acoustic signal processing described herein. The benefit of the use of the DAS system is that an acoustic signal can be obtained across a plurality of locations and/or across a continuous length of the wellbore 114 rather than at discrete locations.

In addition to the DAS system, a surface sensor or sensor system 152 can be used to obtain additional data for the wellbore. The surface sensor system 152 can comprise one or more sensors such as pressure sensors, flow sensors, temperature sensors, and the like. The sensors can detect the conditions within the tubular 120 and/or in one or more annuli such as annuli 119. While only a single annulus between the tubular 120 and the casing 112 is illustrated in FIG. 1, multiple annuli can be present. For example, more than one casing string can often be set at or near the surface of the wellbore during drilling, which can result in two or more annuli (e.g., an annulus between the tubular 120 and the casing 112, an annulus between a first casing 112 and a second casing, an annulus between a casing string and the wellbore wall, etc.). As used herein, reference to the term "surface" can refer to a location above or at the well head (e.g., at the Kelly bushing, rig floor, etc.), near the ground level, and/or within the first 100 m, within the first 150 m, within the first 200 m, or within about the first 300 m along the wellbore as measured from ground level.

Specific spectral signatures can be determined for each event by considering one or more frequency domain features. The resulting spectral signatures can then be used along with processed acoustic signal data to determine if an event is occurring at a depth range of interest. The spectral signatures can be determined by considering the different types of movement and flow occurring within a wellbore and characterizing the frequency domain features for each type of movement.

Figure 2:
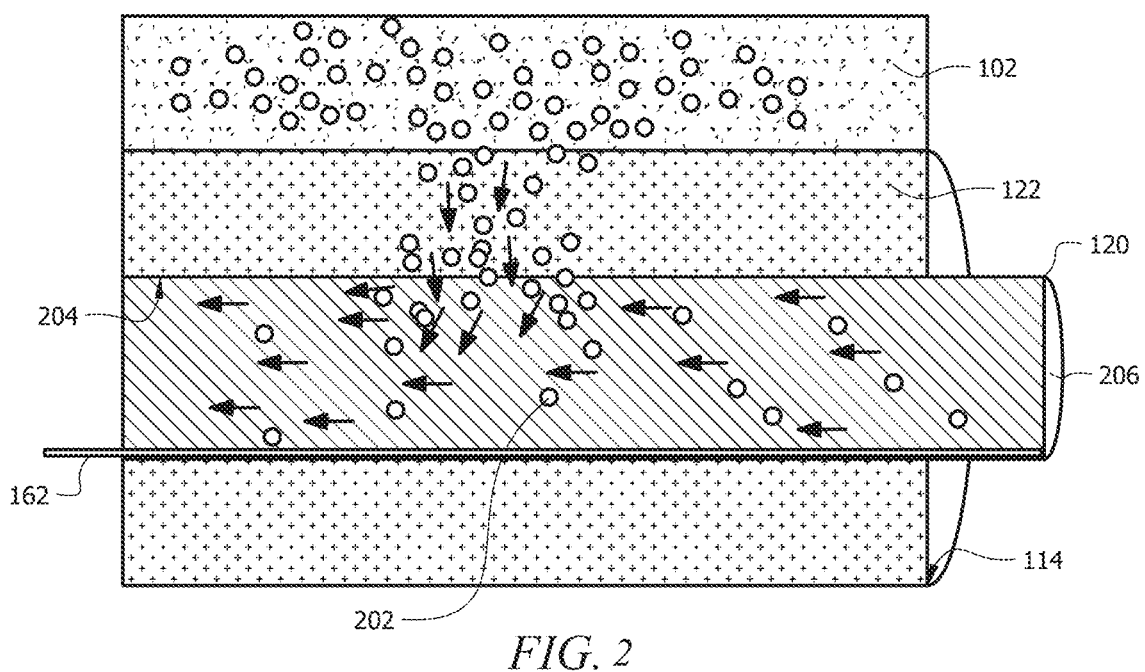
FIG. 2 is a schematic view of an embodiment of a wellbore tubular with fluid ingress according to an embodiment.

By way of example, fluid, which can contain particulates or sand, can be considered as an example of an event generating an acoustic signal. As schematically illustrated in FIG. 2 and shown in the cross-sectional illustrations in FIGS. 3A and 3B, a fluid, which can contain sand 202, can flow from the formation 102 into the wellbore 114 and then into the tubular 120. As the fluid flows into the tubular 120, the sand 202 can collide against the inner surface 204 of the tubular 120, and with the fibre itself in cases where the fibre is placed within the tubular, in a random fashion. The resulting random impacts can produce a random, broadband acoustic signal that can be captured on the optical fibre 162 coupled (e.g., strapped) to the tubular 120. The sand 202 entering the wellbore 114 can be carried within a carrier fluid 206, and the carrier fluid 206 can also generate high intensity acoustic background noise when entering the wellbore 114 due to the turbulence associated with the fluid flowing into the tubular 120. This background noise generated by the turbulent fluid flow is generally expected to be predominantly in a lower frequency region. For example, the fluid inflow acoustic signals can be between about 0 Hz and about 500 Hz, or alternatively between about 0 Hz and about 200 Hz. An increased power intensity can be expected at low frequencies resulting from increased turbulence in the carrier fluid flow. The background noises can be detected as superimposed signals on the broad-band acoustic signals produced by the sand 202 when the sand ingress occurs.

A number of acoustic signal sources can also be considered along with the types of acoustic signals these sources generate. In general, a variety of signal sources can be considered including fluid flow with or without sand through the formation 102, fluid flow with or without sand 202 through a gravel pack 122, fluid flow with or without sand within or through the tubular 120 and/or sand screen 118, fluid flow with sand 202 within or through the tubular 120 and/or sand screen 118, fluid flow without sand 202 into the tubular 120 and/or sand screen 118, gas/liquid inflow, hydraulic fracturing, fluid leaks past restrictions (e.g., gas leaks, liquid leaks, etc.) mechanical instrumentation and geophysical acoustic noises and potential point reflection noise within the fibre caused by cracks in the fibre optic cable/conduit under investigation.

For the flow of gas into the wellbore, the proximity to the optical fibre 162 can result in a high likelihood that any acoustic signals generated would be detected by the optical fibre 162. The flow of a gas into the wellbore would likely result in a turbulent flow over a broad frequency range. For example, the gas inflow acoustic signals can be between about 0 Hz and about 1000 Hz, or alternatively between about 0 Hz and about 500 Hz. An increased power intensity may occur between about 300 Hz and about 500 Hz from increased turbulence in the gas flow. An example of the acoustic signal resulting from the influx of gas into the wellbore can include frequency filtered acoustic intensity in depth versus time graphs for five frequency bins. The five frequency bins represent 5 Hz to 50 Hz, 50 Hz to 100 Hz, 100 Hz to 500 Hz, 500 Hz to 2000 Hz, and 2000 Hz to 5000 Hz. The acoustic intensity in the first three bins can have frequency ranges up to about 500 Hz, with a nearly undetectable acoustic intensity in the frequency range above 500 Hz. At least a portion of the frequency domain features may not be present above 500 Hz, which can help to define the signature of the influx of gas.

For hydraulic fracturing, the self-induced fracturing of the subterranean formation due to various formation conditions can create an acoustic signal. The intensity of such signal may be detected by the optical fibre 162 depending on the distance between the fracture and the optical fibre 162. The resulting fracture can be expected to produce a wide band response having the acoustic energy present in a frequency band between about 0 Hz to about 400 Hz. Some amount of spectral energy can be expected up to about 1000 Hz.

Further, the discrete nature of fracturing events may be seen as a nearly instantaneous broadband high energy event followed by a low-energy, lower frequency fluid flow acoustic signal resulting from fluid flow in response to the fracture.

For the flow of a fluid behind a casing in the wellbore, the proximity of the fluid flow to the optical fibre 162 can result in the acoustic signal being detected. The flow behind the casing can generally be characterized by a flow of fluid through one or more restrictions based on a generally narrow or small leak path being present. The flow through such a restriction may be characterized by an increase in spectral power in a frequency range between about 0 Hz to about 300 Hz with a main energy contribution in the range of about 0 Hz to about 100 Hz, or between about 0 Hz and about 70 Hz.

For acoustic signals generated by mechanical instrumentation and geophysical acoustic noises, the sounds can be detected by the optical fibre 162 in some instances depending on the distance between the sound generation and the portion of the optical fibre 162 being used to detect the sounds. Various mechanical noises would be expected to have low frequency sounds. For example, various motors can operate in the 50 Hz to 60 Hz range, and it is expected that the resulting acoustic signal would have a spectral energy in a narrow band. It can also be expected that various mechanical instrumentation noises may be the strongest at or near the surface of the wellbore. Various geophysical sounds may have even lower frequencies. As a result, it is expected that the sounds from the mechanical instrumentation and geophysical sources can be filtered out based on a low-pass frequency filter.

For point reflection type noises, these are usually broadband in nature but can occur at spatially confined depths and usually do not span the expected spatial resolution of the interrogator. These may be removed as part of the pre-processing steps by spatial averaging or median filtering the data through the entire depth of the fibre.

Based on the expected sound characteristics from the potential acoustic signal sources, the acoustic signature of each event can be defined relative to background noise contributions. Referring again to FIG. 1, the processor 168 within the acquisition device 160 can be configured to perform various data processing to detect the presence of one or more events along the length of the wellbore 114. The acquisition device 160 can comprise a memory 170 configured to store an application or program to perform the data analysis. While shown as being contained within the acquisition device 160, the memory 170 can comprise one or more memories, any of which can be external to the acquisition device 160. In an embodiment, the processor 168 can execute the program, which can configure the processor 168 to filter the acoustic data set spatially, determine one or more frequency domain features of the acoustic signal, compare the resulting frequency domain feature values to the acoustic signatures, and determine whether or not an event is occurring at the selected location based on the analysis and comparison. The analysis can be repeated across various locations along the length of the wellbore 114 to determine the occurrence of one or more events and/or event locations along the length of the wellbore 114.

At the same time, one or more wellbore parameters can be measured with the sensor system 152. For example, the sensors can be used to detect the pressure(s), flow rate(s), temperature(s), and the like at one or more locations at or near the surface of the wellbore. For example, a pressure in the tubular, and one or more annuli can be monitored over time. The measurements can be stored with a time stamp and/or stored with the acquired acoustic data set so that the two data sets can be time correlated after processing the acoustic signal.

When the acoustic sensor comprises a DAS system, the optical fibre 162 can return raw optical data in real time or near real time to the acquisition unit 160. In an embodiment, the raw data can be stored in the memory 170 for various subsequent uses. The sensor 164 can be configured to convert the raw optical data into an acoustic data set. Depending on the type of DAS system employed, the optical data may or may not be phase coherent and may be pre-processed to improve the signal quality (e.g., for opto-electronic noise normalization/de-trending single point-reflection noise removal through the use of median filtering techniques or even through the use of spatial moving average computations with averaging windows set to the spatial resolution of the acquisition unit, etc.).

Figure 4:
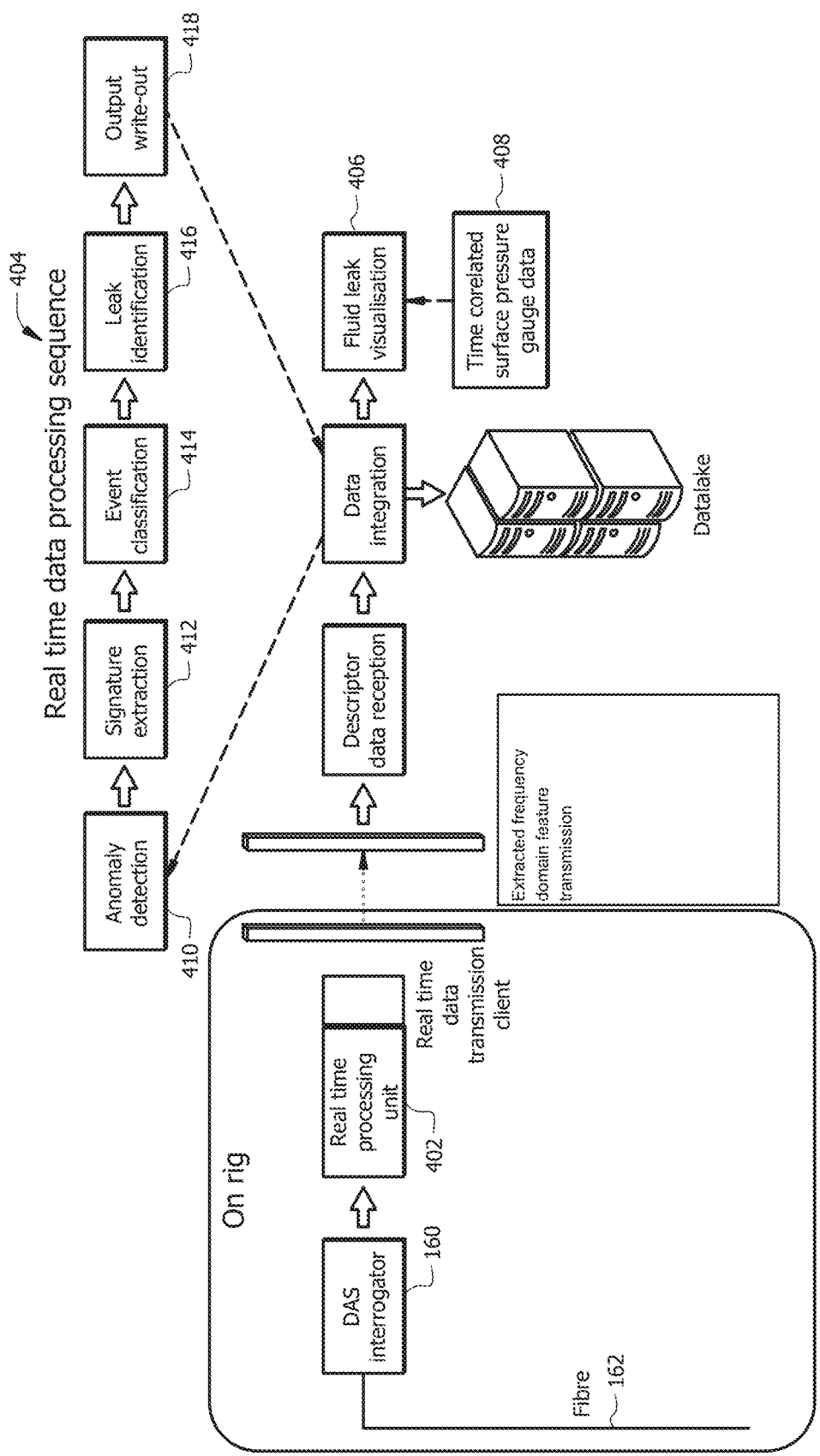
FIG. 4 illustrates an embodiment of a schematic processing flow for an acoustic signal.

As shown schematically in FIG. 4, an embodiment of a system for detecting various event conditions such as a leak detection can comprise a data extraction unit 402, a processing unit 404, a peripheral sensor data correlation unit 408, and/or an output or visualization unit 406. The system comprises of a DAS interrogator 160 connected to the fibre optic cable 162 deployed in the wellbore. The data from the DAS interrogator is transmitted in real time to a data processing unit 402 that receives and processes the data in real time. The data processing unit 402 can perform a variety of processing steps on the acoustic sample data. In an embodiment, the acoustic sample can be noise de-trended. The noise de-trended acoustic variant data can be subjected to an optional spatial filtering step following the pre-processing steps, if present. This is an optional step and helps focus primarily on an interval of interest in the wellbore. For example, the spatial filtering step can be used to focus on a producing interval where there is maximum likelihood of a leak when a leak event is being examined. In an embodiment, the spatial filtering can narrow the focus of the analysis to a reservoir section and also allow a reduction in data typically of the order of ten times, thereby simplifying the data analysis operations. The resulting data set produced through the conversion of the raw optical data can be referred to as the acoustic sample data.

This type of filtering can provide several advantages in addition to the data set size reduction. Whether or not the acoustic data set is spatially filtered, the resulting data, for example the acoustic sample data, used for the next step of the analysis can be indicative of an acoustic sample over a defined depth (e.g., the entire length of the optical fibre, some portion thereof, or a point source in the wellbore 114). In some embodiments, the acoustic data set can comprise a plurality of acoustic samples resulting from the spatial filtering to provide data over a number of depth ranges. In some embodiments, the acoustic sample may contain acoustic data over a depth range sufficient to capture multiple points of interest. In some embodiments, the acoustic sample data contains information over the entire frequency range at the depth represented by the sample. This is to say that the various filtering steps, including the spatial filtering, do not remove the frequency information from the acoustic sample data.

The processing unit 402 can also be used to generate and extract acoustic descriptors (e.g., also referred to as frequency domain features herein) from the acoustic data set. In an embodiment, the data extraction unit 402 can obtain the optical data and perform the initial pre-processing steps to obtain the initial acoustic information from the signal returned from the wellbore. Various analyses can be performed including frequency domain feature extraction, frequency band extraction, frequency analysis and/or transformation, intensity and/or energy calculations, and/or determination of one or more frequency domain features of the acoustic data. In order to obtain the frequency domain features, the data processing unit 402 can be further configured to perform Discrete Fourier transformations (DFT) or a short time Fourier transform (STFT) of the acoustic variant time domain data measured at each depth section along the fibre or a section thereof to spectrally check the conformance of the acoustic sample data to one or more acoustic signatures. The spectral conformance check can be used to determine if the expected signature of an event is present in the acoustic sample data. Spectral feature extraction through time and space can be used to determine the spectral conformance and determine if an acoustic signature (e.g., a sand ingress fingerprint, gas influx, hydraulic fracturing signature, etc.) is present in the acoustic sample. Within this process, various frequency domain features can be calculated for the acoustic sample data.

The use of the frequency domain features to identify one or more events has a number of advantages. First, the use of the frequency domain features results in significant data reduction relative to the raw DAS data stream. Thus, a number of frequency domain features can be calculated to allow for event identification while the remaining data can be discarded or otherwise stored, while the remaining analysis can performed using the frequency domain features. Even when the raw DAS data is stored, the remaining processing power is significantly reduced through the use of the frequency domain features rather than the raw acoustic data itself. Further, the use of the frequency domain features provides a concise, quantitative measure of the spectral character or acoustic signature of specific sounds pertinent to downhole fluid surveillance and other applications that may directly be used for real-time, application-specific signal processing.

While a number of frequency domain features can be determined for the acoustic sample data, not every frequency domain feature may be used in the characterization of each acoustic signature. The frequency domain features represent specific properties or characteristics of the acoustic signals. There are a number of factors that can affect the frequency domain feature selection for each event. For example, a chosen descriptor should remain relatively unaffected by the interfering influences from the environment such as interfering noise from the electronics/optics, concurrent acoustic sounds, distortions in the transmission channel, and the like. In general, electronic/instrumentation noise is present in the acoustic signals captured on the DAS or any other electronic gauge, and it is usually an unwanted component that interferes with the signal. Thermal noise is introduced during capturing and processing of signals by analogue devices that form a part of the instrumentation (e.g., electronic amplifiers and other analog circuitry). This is primarily due to thermal motion of charge carriers. In digital systems additional noise may be introduced through sampling and quantization. The frequency domain features should avoid any interference from these sources.

As a further consideration in selecting the frequency domain feature(s) for an event, the dimensionality of the frequency domain feature should be compact. A compact representation is desired to decrease the computational complexity of subsequent calculations. The frequency domain feature should also have discriminant power. For example, for different types of audio signals, the selected set of descriptors should provide altogether different values. A measure for the discriminant power of a feature is the variance of the resulting feature vectors for a set of relevant input signals. Given different classes of similar signals, a discriminatory descriptor should have low variance inside each class and high variance over different classes. The frequency domain feature should also be able to completely cover the range of values of the property it describes. As an example, the chosen set of frequency domain features should be able to completely and uniquely identify the signatures of each of the acoustic signals pertaining to a selected downhole surveillance application or event as described herein. Such frequency domain features can include, but are not limited to, the spectral centroid, the spectral spread, the spectral roll-off, the spectral skewness, the root mean square (RMS) band energy (or the normalized subband energies/band energy ratios), a loudness or total RMS energy, spectral flatness, spectral slope, spectral kurtosis, a spectral flux, spectral entropy, and a spectral auto-correlation function.

The spectral centroid denotes the "brightness" of the sound captured by the optical fibre 162 and indicates the center of gravity of the frequency spectrum in the acoustic sample. The spectral centroid can be calculated as the weighted mean of the frequencies present in the signal, where the magnitudes of the frequencies present can be used as their weights in some embodiments. The value of the spectral centroid, $C_i$, of the $i^{th}$ frame of the acoustic signal captured at a spatial location on the fibre, may be written as:

$$C_i = \frac{\sum_{k=1}^{N} f(k)X_i(k)}{\sum_{k=1}^{N} X_i(k)} \quad \text{(Eq. 1)}$$

Where $X_i(k)$, is the magnitude of the short time Fourier transform of the $i^{th}$ frame where 'k' denotes the frequency coefficient or bin index, N denotes the total number of bins and $f(k)$ denotes the centre frequency of the bin. The computed spectral centroid may be scaled to value between 0 and 1. Higher spectral centroids typically indicate the presence of higher frequency acoustics and help provide an immediate indication of the presence of high frequency noise. The calculated spectral centroid can be compared to a spectral centroid threshold or range for a given event, and when the spectral centroid meets or exceeds the threshold, the event of interest may be present.

The absolute magnitudes of the computed spectral centroids can be scaled to read a value between zero and one. The turbulent noise generated by other sources such as fluid flow and inflow may typically be in the lower frequencies (e.g., under about 100 Hz) and the centroid computation can produce lower values, for example, around or under 0.1 post rescaling. The introduction of fluid or fluid carrying sand can trigger broader frequencies of sounds (e.g., a broad band response) that can extend in spectral content to higher frequencies (e.g., up to and beyond 5,000 Hz). This can produce centroids of higher values (e.g., between about 0.2 and about 0.7, or between about 0.3 and about 0.5), and the magnitude of change would remain fairly independent of the overall concentration of sanding assuming there is a good signal to noise ratio in the measurement assuming a traditional electronic noise floor (e.g., white noise with imposed flicker noise at lower frequencies).

The spectral spread can also be determined for the acoustic sample. The spectral spread is a measure of the shape of the spectrum and helps measure how the spectrum is distributed around the spectral centroid. In order to compute the spectral spread, $S_i$, one has to take the deviation of the spectrum from the computed centroid as per the following equation (all other terms defined above):

$$S_i = \sqrt{\frac{\sum_{k=1}^{N}(f(k)-C_i)^2 X_i(k)}{\sum_{k=1}^{N} X_i(k)}} \quad \text{(Eq. 2)}$$

Lower values of the spectral spread correspond to signals whose spectra are tightly concentrated around the spectral centroid. Higher values represent a wider spread of the spectral magnitudes and provide an indication of the presence of a broad band spectral response. The calculated spectral spread can be compared to a spectral spread threshold or range, and when the spectral spread meets or exceeds the threshold or falls within the range, the event of interest may be present.

The spectral roll-off is a measure of the bandwidth of the audio signal. The Spectral roll-off of the $i^{th}$ frame, is defined as the frequency bin 'y' below which the accumulated magnitudes of the short-time Fourier transform reach a certain percentage value (usually between 85%-95%) of the overall sum of magnitudes of the spectrum.

$$\sum_{k=1}^{y}|X_i(k)| = \frac{c}{100}\sum_{k=1}^{N}|X_i(k)| \quad \text{(Eq. 3)}$$

Where c=85 or 95. The result of the spectral roll-off calculation is a bin index and enables distinguishing acoustic events based on dominant energy contributions in the frequency domain. (e.g., between gas influx and fluid flow, etc.)

The spectral skewness measures the symmetry of the distribution of the spectral magnitude values around their arithmetic mean.

The RMS band energy provides a measure of the signal energy within defined frequency bins that may then be used for signal amplitude population. The selection of the bandwidths can be based on the characteristics of the captured acoustic signal. In some embodiments, a sub-band energy ratio representing the ratio of the upper frequency in the selected band to the lower frequency in the selected band can range between about 1.5:1 to about 3:1. In some embodiments, the sub-band energy ratio can range from about 2.5:1 to about 1.8:1, or alternatively be about 2:1. In some embodiment, selected frequency ranges for a signal with a 5,000 Hz Nyquist acquisition bandwidth can include: a first bin with a frequency range between 0 Hz and 20 Hz, a second bin with a frequency range between 20 Hz and 40 Hz, a third bin with a frequency range between 40 Hz and 80 Hz, a fourth bin with a frequency range between 80 Hz and 160 Hz, a fifth bin with a frequency range between 160 Hz and 320 Hz, a sixth bin with a frequency range between 320 Hz and 640 Hz, a seventh bin with a frequency range between 640 Hz and 1280 Hz, an eighth bin with a frequency range between 1280 Hz and 2500 Hz, and a ninth bin with a frequency range between 2500 Hz and 5000 Hz. While certain frequency ranges for each bin are listed herein, they are used as examples only, and other values in the same or a different number of frequency range bins can also be used. In some embodiments, the RMS band energies may also be expressed as a ratiometric measure by computing the ratio of the RMS signal energy within the defined frequency bins relative to the total RMS energy across the acquisition (Nyquist) bandwidth. This may help to reduce or remove the dependencies on the noise and any momentary variations in the broadband sound.

The total RMS energy of the acoustic waveform calculated in the time domain can indicate the loudness of the acoustic signal. In some embodiments, the total RMS energy can also be extracted from the temporal domain after filtering the signal for noise.

The spectral flatness is a measure of the noisiness/tonality of an acoustic spectrum. It can be computed by the ratio of the geometric mean to the arithmetic mean of the energy spectrum value and may be used as an alternative approach to detect broadbanded signals (e.g., such as those caused by sand ingress). For tonal signals, the spectral flatness can be close to 0 and for broader band signals it can be closer to 1.

The spectral slope provides a basic approximation of the spectrum shape by a linearly regressed line. The spectral slope represents the decrease of the spectral amplitudes from low to high frequencies (e.g., a spectral tilt). The slope, the y-intersection, and the max and media regression error may be used as features.

The spectral kurtosis provides a measure of the flatness of a distribution around the mean value.

The spectral flux is a measure of instantaneous changes in the magnitude of a spectrum. It provides a measure of the frame-to-frame squared difference of the spectral magnitude vector summed across all frequencies or a selected portion of the spectrum. Signals with slowly varying (or nearly constant) spectral properties (e.g.: noise) have a low spectral flux, while signals with abrupt spectral changes have a high spectral flux. The spectral flux can allow for a direct measure of the local spectral rate of change and consequently serves as an event detection scheme that could be used to pick up the onset of acoustic events that may then be further analyzed using the feature set above to identify and uniquely classify the acoustic signal.

The spectral autocorrelation function provides a method in which the signal is shifted, and for each signal shift (lag) the correlation or the resemblance of the shifted signal with the original one is computed. This enables computation of the fundamental period by choosing the lag, for which the signal best resembles itself, for example, where the autocorrelation is maximized. This can be useful in exploratory signature analysis/even for anomaly detection for well integrity monitoring across specific depths where well barrier elements to be monitored are positioned.

Any of these frequency domain features, or any combination of these frequency domain features, can be used to provide an acoustic signature for a downhole event. In an embodiment, a selected set of characteristics can be used to provide the acoustic signature for each event, and/or all of the frequency domain features that are calculated can be used as a group in characterizing the acoustic signature for an event. The specific values for the frequency domain features that are calculated can vary depending on the specific attributes of the acoustic signal acquisition system, such that the absolute value of each frequency domain feature can change between systems. In some embodiments, the frequency domain features can be calculated for each event based on the system being used to capture the acoustic signal and/or the differences between systems can be taken into account in determining the frequency domain feature values for each signature between the systems used to determine the values and the systems used to capture the acoustic signal being evaluated.

In order to obtain the frequency domain features, the acoustic sample data can be converted to the frequency domain. In an embodiment, the raw optical data may contain or represent acoustic data in the time domain. A frequency domain representation of the data can be obtained using a Fourier Transform. Various algorithms can be used as known in the art. In some embodiments, a Short Time Fourier Transform technique or a Discrete Time Fourier transform can be used. The resulting data sample may then be represented by a range of frequencies relative to their power levels at which they are present. The raw optical data can be transformed into the frequency domain prior to or after the application of the spatial filter. In general, the acoustic sample will be in the frequency domain in order to determine the spectral centroid and the spectral spread. In an embodiment, the processor 168 can be configured to perform the conversion of the raw acoustic data and/or the acoustic sample data from the time domain into the frequency domain. In the process of converting the signal to the frequency domain, the power across all frequencies within the acoustic sample can be analyzed. The use of the processor 168 to perform the transformation may provide the frequency domain data in real time or near real time.

The data processing unit 402 can then be used to analyze the acoustic sample data in the frequency domain to obtain one or more of the frequency domain features and provide an output with the determined frequency domain features for further processing. In some embodiments, the output of the frequency domain features can include features that are not used to determine the presence of every event.

The output of the processor with the frequency domain features for the acoustic sample data can then be used to determine the presence of one or more events at one or more locations in the wellbore corresponding to depth intervals over which the acoustic data is acquired or filtered. In some embodiments, the determination of the presence of one or more events can include comparing the frequency domain features with the frequency domain feature thresholds or ranges in each event signature. When the frequency domain features in the acoustic sample data match one or more of the event signatures, the event can be identified as having occurred during the sample data measurement period, which can be in real time. Various outputs can be generated to display or indicate the presence of the one or more events.

The processed acoustic data (i.e., the frequency domain features), which can have a significantly smaller file size (typically over 1000× smaller) can then be written into a file (e.g., an ASCII file) in a memory at certain intervals (e.g., every second, every ten seconds, etc.), which can then be retrieved and transmitted through network using a data collection and transmission software. This process can be executed in real time or near real time for transmission of data.

The data transmitted from the DAS interrogator (that includes the frequency domain feature data) can then be further processed using a sequence of data processing steps as shown in the processing sequence 404 in FIG. 4. The processing sequence 404 can comprise a series of steps including an anomaly detection step, a signature extraction step, an event classification step, a leak identification step, and an output step. The descriptor data are first processed using an anomaly detection (e.g., an event-detection) algorithm to determine the presence of any anomalous acoustic response(s) that may be triggered by a fluid leak. While there are several ways to implement the event detection algorithm, amplitude thresholding of the data relative to surface noise captured by the DAS on the fibre optic cable dispersed at or near the surface (e.g., within the first 100 meters) of the well head can be used. As an example of amplitude thresholding, an acoustic intensity over the entire bandwidth can be averaged over the surface or near surface measurements (e.g., in the first 300 m of acoustic data) acquisitions to provide an estimate of the average surface acoustic noise. A threshold can then be taken as a percentage of this average. For example, the amplitude threshold can be between about 90% and about 95% of the average. The presence of the signal within the wellbore can be detected when the amplitude of the acoustic event captured exceeds the threshold value. The frequency and amplitude characteristics of the surface noise may also be used to suppress and/or reduce the background noise within the selected window to identify presence of signals at the surface, if needed. This enables a zero point depth recognition, helps to reduce or eliminate surface noise contributions, helps to reduce or eliminate the DAS interrogator noise contributions, allows for the capture of acoustic events and renders the captured events in a format ready for signature recognition, and uses processed data (as compared to raw DAS data) as the primary feed to the processing sequence. While amplitude thresholding is used, other time based digital processing approaches could also be used.

Figure 5A:
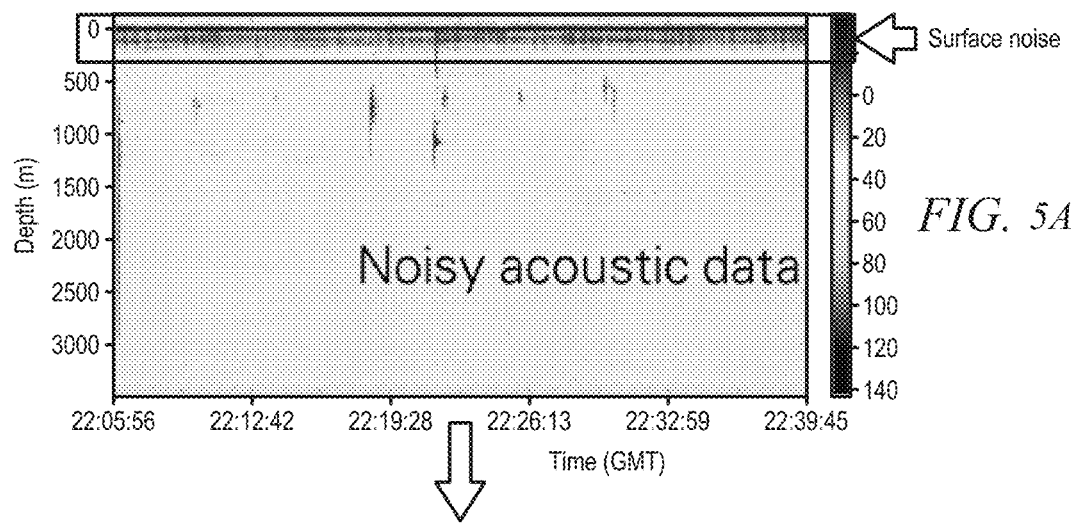
FIGS. 5A and 5B illustrate exemplary acoustic depth-time block graphs.
Figure 5B:
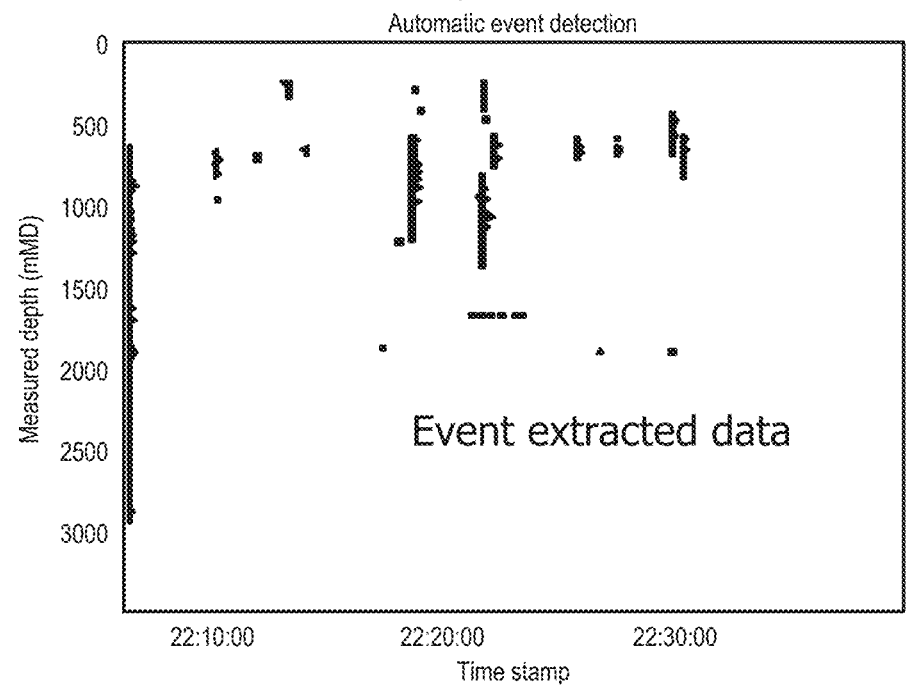

Once the data is initially processed, the anomalous events can be recognized (e.g., as events having amplitudes over the thresholds), and the corresponding data from the portion of the acoustic sample can be extracted as a depth-time event block. FIG. 5A illustrates an example of a depth-time event block showing depth versus amplitude. Once the depth-time blocks are amplitude thresholded, the corresponding data may appear as shown in FIG. 5B, with the surface noise filtered out and the anomalous events highlighted.

In the second step 412 of the processing sequence 404, the acoustic event blocks can be further analyzed by extracting the frequency domain features at the event depths and times identified by the anomalous event detection step and comparing the extracted frequency domain features to the event signatures to match the frequency domain features for each identified event with an appropriate signature. The extraction of the frequency domain features can be performed prior to the data being sent to the processing sequence such that the extraction of the frequency domain features involves filtering the received frequency domain features for the depth and times identified by the anomalous event detection, or the extraction of the frequency domain features can be performed only after the anomalous depth-time blocks have been identified.

In either event, the resulting frequency domain features can be compared with one or more event signatures to identify if an integrity event has occurred in the event classification step 414. In some embodiments, the event signatures can include frequency domain signatures for a liquid leak, a gas leak, a self-induced hydraulic fracture, a shear re-activation, or another such event (e.g., an unrecognized event category or other non-leak signatures, which can be used for comparison).

Figure 6A:
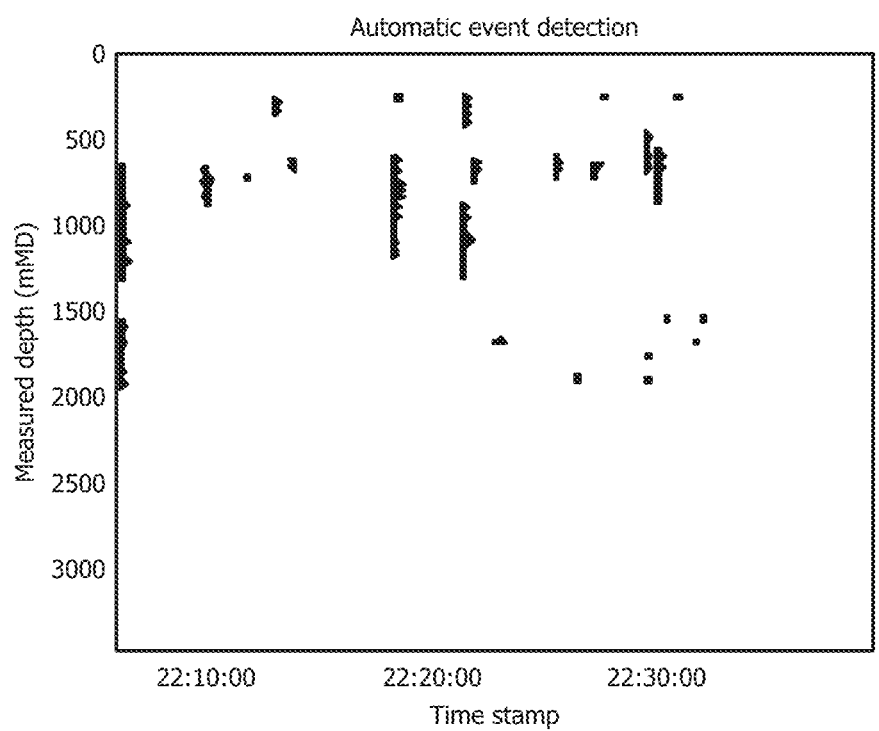
FIGS. 6A, 6B, and 6C illustrate exemplary filtered acoustic depth-time graphs.
Figure 6B:
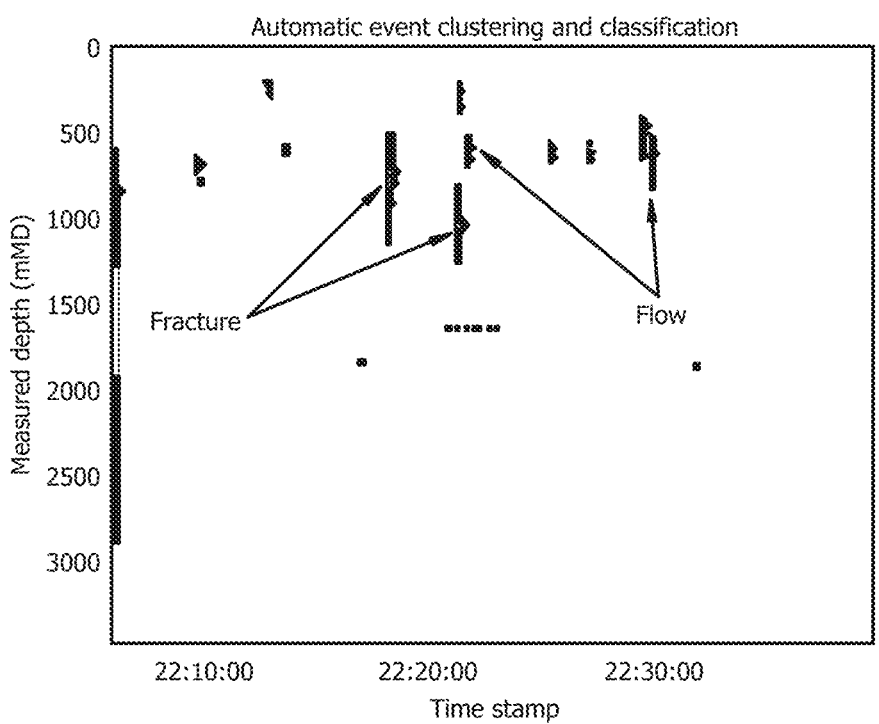

The event classification step 414 can be executed at each depth location along the fibre and may depend on the acoustic signatures captured at the locations identified to have an anomalous event. Once classified into the appropriate category, the intensities of the events can be determined using the normalized RMS values within the appropriate frequency bands extracted on site (e.g., which can already be one of the descriptors obtained in the extracted frequency domain features) from the raw acoustic data. The descriptor data can then be transformed and re-written as an event matrix. These steps can be executed in near real time at the data integration server, and the transformed decision ready well integrity event data can be stored along with some or all of the acoustic descriptor data. The classified event data may also be visualized as a three dimensional depth versus time versus event type intensity plot as shown in FIG. 6A and FIG. 6B to illustrate well integrity events as a function of depth and time, where event type can be depicted using different colours for different event types.

Figure 6C:
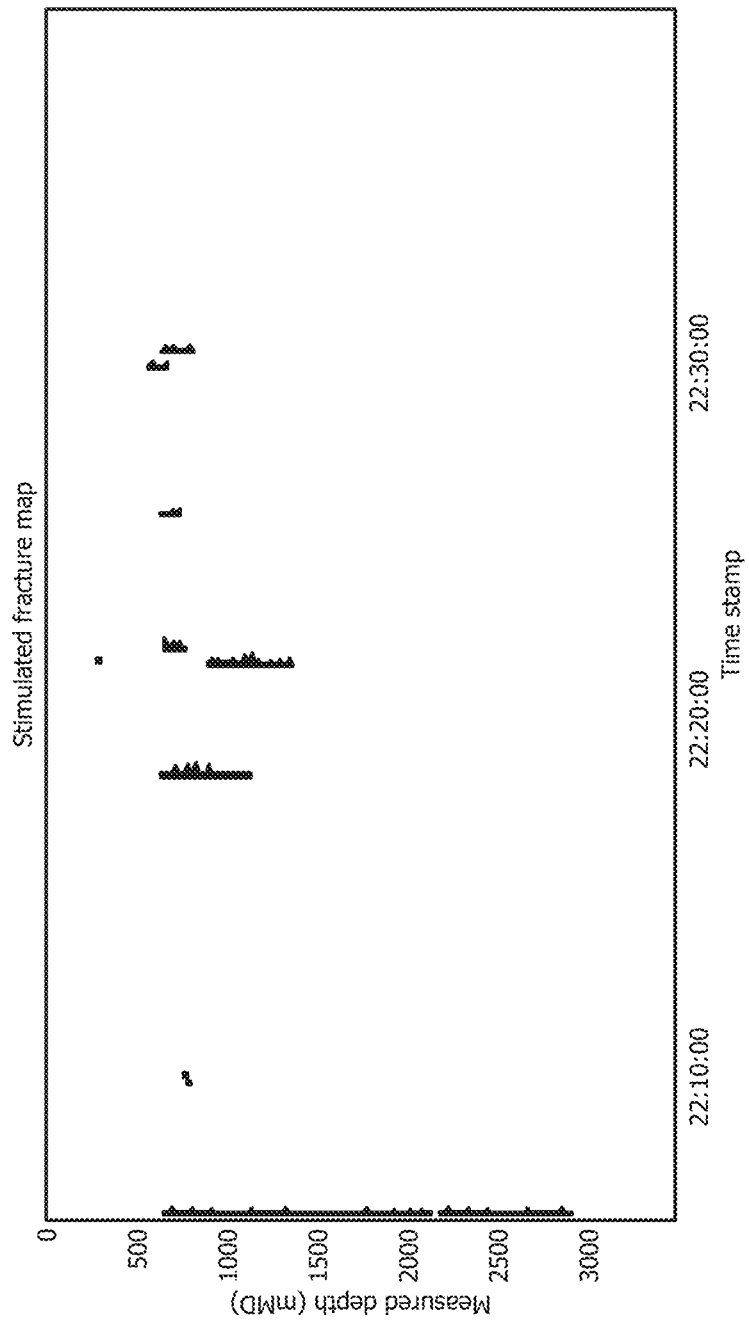

The event matrix may be further filtered to highlight and visualize certain types of well integrity events as shown in FIG. 6C. These may also be aligned in depth to the well completion schematic and/or the geological maps (e.g., discrete pressure zones) to ascertain the source of the leaking fluid in case of liquid leaks.

Figure 7:
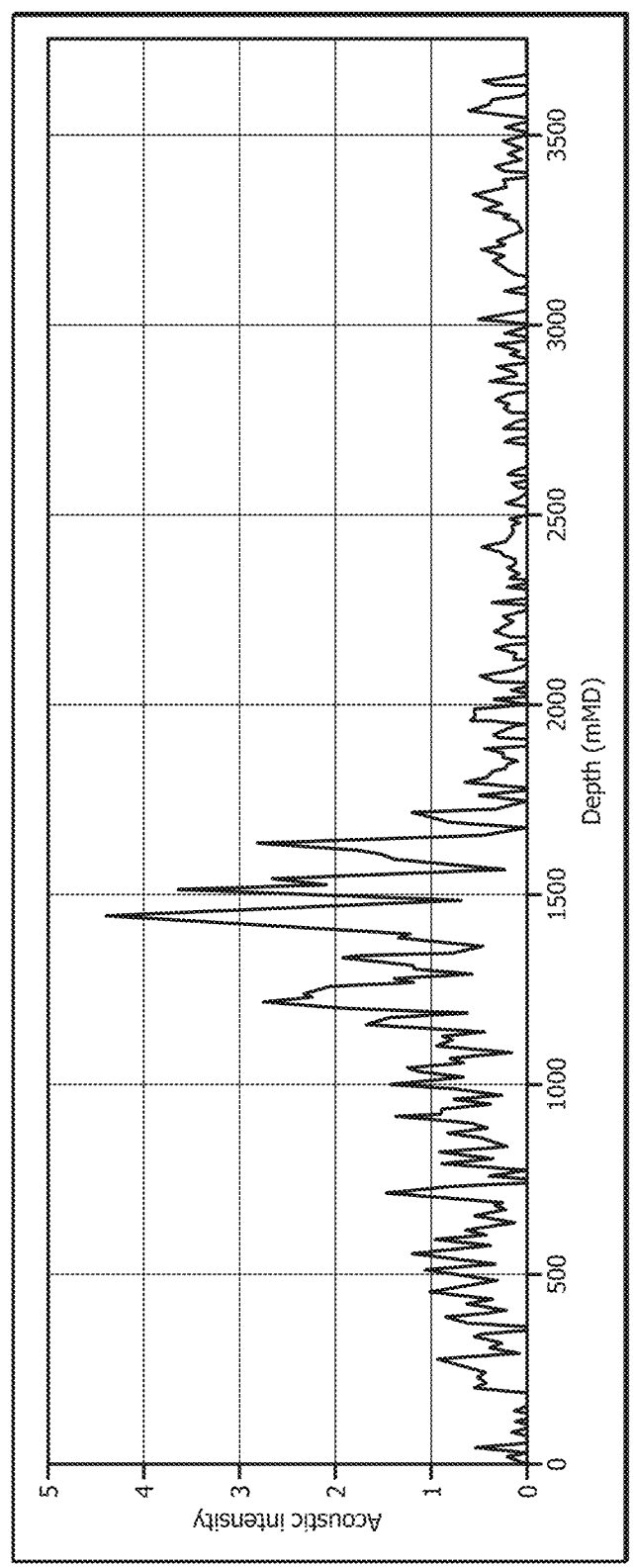
FIG. 7 illustrates an exemplary leak log according to an embodiment.

In the leak detection and identification step 416, the event matrix may also be processed further to obtain semi-quantitative leak assessment by filtering the event matrix to extract the events correlating to gas or liquid leaks and then integrating the filtered intensity data through time to provide fluid leak logs, an example of which is shown in FIG. 7.

In producing a visualization fluid leak log, the RMS spectral energy for depth sections that do not exhibit the spectral conformance to specific well and overburden integrity events can be set to zero. This allows those depth points or zones having one or more frequency domain features greater than the thresholds to be easily observed. FIG. 7 represents an example of an embodiment of a fluid leak log showing acoustic intensity against depth. This figure illustrates the locations having fluid leaks as peaks in the acoustic intensity. The acoustic intensity and its visualization on the fluid leak log can therefore be used to identify the relative contribution of the fluid leaks at different points along the wellbore. For example, it may be possible to determine which zone is contributing the greatest proportion of the fluid leaks, which zone contributes the second greatest portion of the fluid leaks, and so on. This may also allow for correlation of one or more zonal isolation devices, potential leak locations, and/or fluid flow through the formation along the length of the wellbore.

The use of the processing sequence 404 can result in a suitable identification of the fluid leaks within the wellbore. In an optional processing step in the secondary (i.e. peripheral) sensor data correlation unit 408, the resulting processed data can be correlated with external sensor data such as that provided by a sensor system at or near the surface of the wellbore. This processing sequence may be used with the DAS system to determine the flow path for the leaks, especially in cases where there are multiple casing strings or leak paths at or near a depth determined to have a leak. The process may also be used to provide a semi-quantitative estimate of the volumes of fluid associated with the leak when combined with surface measurements (e.g., bleed off rate measurements, surface pressure gauge data, etc.).

The correlation process can generally comprise the use of changing surface measurement data as a comparison with the identified event process. For example, changing pressure or flow data at the surface can be used as a correlation with the leak identification data. It may be expected that as the leak occurs, a shut in annulus may have a pressure rise and/or an increased flow rate (e.g., a bleed off flow rate). When multiple annuli or leak paths are present, the use of the pressure or flow data can help to identify which leak path(s) are specifically experiencing the leaks, while the leak depth would be known from the event detection sequence. While described herein as a leak path, a number of potential paths are available for fluid flow within the wellbore. For example, a leak can occur past a restriction or barrier in one or more annuli, between a casing and the formation, and/or within the formation or a hydrocarbon zone, and potentially, into a production assembly. For example, fluid flow within a hydrocarbon zone in the formation can be monitored using any of the methods and systems described herein.

In an embodiment, a correlation process may begin by shutting in a well. This may allow a base reading to be taken of both the surface sensor data and the frequency domain features of the wellbore without fluid flow. Once the baseline readings have been obtained, a leak path can be triggered to potentially induce a fluid flow. For example, an annulus can be opened to bleed off pressure, which can potentially induce fluid flow within that annulus if there is a leak in fluid communication with the selected annulus. This may create a pressure differential between the selected annulus and the neighboring annulus or annuli. The pressure differential can be determined to assess the fluid flow potentials. Once one leak path has been tested, it can be closed and another leak path can be triggered. This sequence can continue until all of the desired leak paths that are to be tested are triggered. The DAS monitoring system would remain active during the induced flow process to monitor for leaks and ascertain the leaking fluid phase or phases.

Once the data is obtained from the sensors and the DAS system, which can include the event data determined from the processing sequence 404 to determine the presence or absence of any events, the data can be correlated through time to determine a leak location and leak path. For example, the filtered fluid leak acoustic intensities obtained from the processing sequence 404 can be integrated through time at each depth location to obtain leak data (e.g., which can be visualized as leak logs) for the stages of the leak path triggering (e.g., the annular pressure bleed process). This data can then be aligned in time with the pressures, pressure differentials, flow data, etc. for each trigger operation to determine the leak points and flow paths. For example, it may be determined that a given leak path only triggers a leak at a given depth rather than over a number of depths. From this data, the leak logs can be determined for each tubular, casing string, or the like.

In some embodiments, all of the surface sensor data can be used in this process. The pressure data, including the induced pressure differentials, may be used to determine the leak paths and leak locations. The bleed off rates can be used to provide a quantitative assessment of the leak rates from each leak path. This data can then be stored and/or outputted and used in the future for further leak identification and quantification.

In other embodiments, the monitoring process can be used to monitor overburden event detection. In general, this process may be similar to that discussed above with respect to leak detection, and the processing sequence 404 may include event signatures for overburden movements (e.g., self-induced hydraulic fractures, etc.). The pressure and flowrate monitoring using surface sensors can also be used. When an overburden event occurs, a change in the production rate (e.g., an increase or decrease in some zones versus others) may occur. The pressure and/or flow rate of the production string and/or one or more production assemblies (if such sensors are available on the production assemblies) can be integrated with the event data to determine the presence and depth of the overburden event. An increase or decrease in the flow rate may be used to quantify the resulting change in any production zone.

Figure 8:
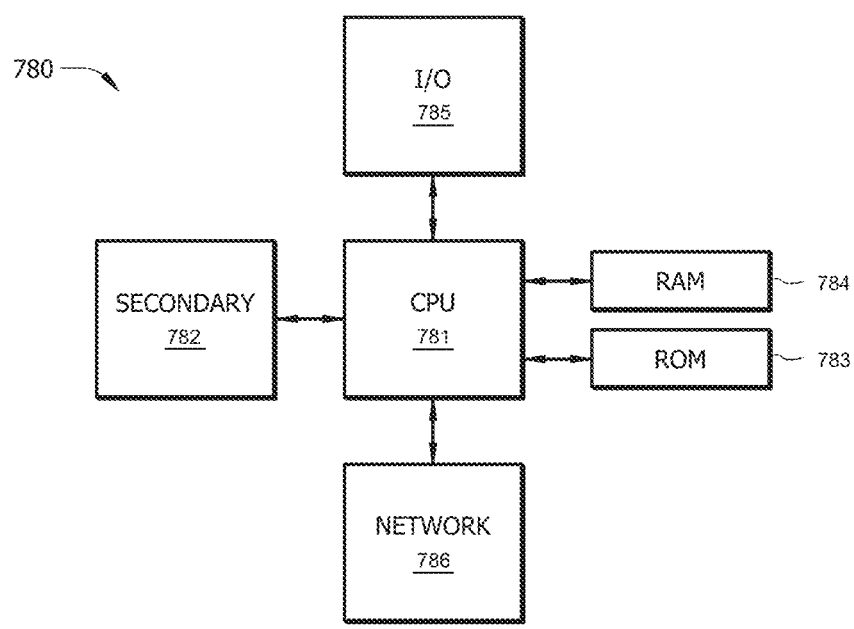
FIG. 8 schematically illustrates a computer that can be used to carry out various steps according to some embodiments.

Any of the systems and methods disclosed herein can be carried out on a computer or other device comprising a processor, such as the acquisition device 160 of FIG. 1. FIG. 8 illustrates a computer system 780 suitable for implementing one or more embodiments disclosed herein such as the acquisition device or any portion thereof. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 780 is turned on or booted, the CPU 782 may execute a computer program or application. For example, the CPU 782 may execute software or firmware stored in the ROM 786 or stored in the RAM 788. In some cases, on boot and/or when the application is initiated, the CPU 782 may copy the application or portions of the application from the secondary storage 784 to the RAM 788 or to memory space within the CPU 782 itself, and the CPU 782 may then execute instructions that the application is comprised of. In some cases, the CPU 782 may copy the application or portions of the application from memory accessed via the network connectivity devices 792 or via the I/O devices 790 to the RAM 788 or to memory space within the CPU 782, and the CPU 782 may then execute instructions that the application is comprised of. During execution, an application may load instructions into the CPU 782, for example load some of the instructions of the application into a cache of the CPU 782. In some contexts, an application that is executed may be said to configure the CPU 782 to do something, e.g., to configure the CPU 782 to perform the function or functions promoted by the subject application. When the CPU 782 is configured in this way by the application, the CPU 782 becomes a specific purpose computer or a specific purpose machine.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network (e.g., to an event database) in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), flash drive, ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media. While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

We claim:

1. A method of detecting a leak within a wellbore or formation, the method comprising:
    inducing a pressure differential within a wellbore comprising a fluid;
    obtaining a sample data set from a sensor within the wellbore while inducing the pressure differential, wherein the sample data set is a sample of an acoustic signal originating within the wellbore, and wherein the sample data set is representative of the acoustic signal across a frequency spectrum;
    determining, using a processor, a plurality of frequency domain features of the sample data set at each depth of one or more depths within the wellbore, wherein each frequency domain feature of the plurality of frequency domain features at each depth are derived from across the frequency spectrum;
    identifying, using the processor, a flow condition at a first depth of the one or more depths within the wellbore based on determining that the plurality of frequency domain features at the first depth match a flow condition event signature;
    correlating, using the processor, the identified flow condition with the induced pressure differential;
    determining a presence and location of the flow condition at the first depth within the wellbore based on the identification and the presence of the flow condition and the correlating of the flow condition with the induced pressure differential; and
    generating, using the processor, an output that comprises the identification and location of the flow condition, wherein the output is displayed on a user interface.

2. The method of claim 1, wherein inducing the pressure differential comprises inducing fluid flow along a leak path, and wherein the flow condition is a leak event.

3. The method of claim 2, further comprising:
    calculating a normalized RMS energy within a defined frequency band for each leak event at each of the one or more depths within the wellbore, wherein the normalized RMS energy is indicative of a flowrate of a fluid for each leak event.

4. The method of claim 3, further comprising:
    integrating or averaging the normalized RMS energy for each leak event over time; and
    determining a relative fluid flowrate for each leak event based on integrating/averaging the normalized RMS energy for each leak event.

5. The method of claim 2, further comprising:
    correlating the one or more depths within the wellbore with leak events with one or more structural features within the wellbore; and
    determining a source of the leak based on the correlating of the one or more depths with the one or more structural features.

6. The method of claim 2, wherein determining the presence of the leak event comprises determining the fluid phase of the leak by comparing the plurality of frequency domain features to the leak event signature at the one or more depths.

7. The method of claim 1, wherein determining the presence of the flow condition at the first depth comprises comparing the plurality of frequency domain features at each of the one or more depths with the leak event signature.

8. The method of claim 1, further comprising:
    detecting a baseline condition within the wellbore, wherein the wellbore comprises one or more tubular strings and one or more annuli disposed between at least one of: i) two adjacent tubular strings of the one or more tubular strings, ii) a tubular string of the one or more tubular strings and a formation, or iii) both i and ii;
    wherein inducing the pressure differential comprises inducing the pressure differential relative to the baseline condition within a first annuli of the one or more annuli;
    detecting the flow condition within the wellbore based on the plurality of frequency domain features;
    correlating the flow condition with the baseline condition and the induced pressure differential;
    wherein determining the presence and location of the flow condition comprises:
    determining a depth of the flow condition based on the correlating; and
    determining an annuli of the one or more annuli with the flow condition based on the correlating.

9. The method of claim 8, wherein detecting the baseline condition comprises:
    shutting in the wellbore;
    receiving a second acoustic signal while shutting in the wellbore; and
    determining the baseline condition based on the second acoustic signal.

10. The method of claim 8, wherein inducing the pressure differential comprises:

opening a flow valve within the first annuli; and
induce a fluid flow based on opening of the flow valve.

11. The method of claim 8, wherein the pressure differential comprises a difference in pressure between the first annuli and an adjacent flow path in the wellbore.

12. The method of claim 8, wherein detecting the flow condition comprises:
  determining a fluid leak at one or more depths in one or more the wellbore tubular strings based on the plurality of frequency domain features; and
  integrating and time averaging an acoustic intensity for each fluid leak at the one or more depths and one or more tubular strings.

13. The method of claim 8, wherein inducing the pressure differential comprises releasing a fluid from the first annuli, wherein the method further comprises:
  correlating a flow rate of the fluid released from the first annuli with the flow condition; and
  determining a leak rate based on the correlation of the flow rate of the fluid released from the first annuli with the flow condition.

14. The method of claim 8, wherein the acoustic signal is received from a sensor in the wellbore, and wherein the sensor comprises a fibre optic cable disposed within the wellbore.

15. The method of claim 8, wherein the plurality of frequency domain features of the acoustic signal comprise at least two of: a spectral centroid, a spectral spread, a spectral roll-off, a spectral skewness, an RMS band energy, a total RMS energy, a spectral flatness, a spectral slope, a spectral kurtosis, a spectral flux, spectral entropy, or a spectral autocorrelation function.

16. The method of claim 15, wherein the plurality of frequency domain features of the acoustic signal comprise the spectral centroid and the spectral spread.

17. A method of detecting a flow condition within a wellbore, the method comprising:
  obtaining a surface acoustic data set from a sensor;
  determining a surface amplitude threshold based on the surface acoustic data set; and
  filtering an acoustic data set based on the surface amplitude threshold to produce a sample data set, wherein the sample data set comprises acoustic data obtained from a sensor within the wellbore at the one or more depths having an amplitude above the surface amplitude threshold, and wherein the sample data set is representative of the acoustic signal across a frequency spectrum
  inducing a pressure differential within a wellbore comprising a fluid;
  determining a plurality of frequency domain features of the sample data set, wherein each frequency domain feature of the plurality of frequency domain features are derived from across the frequency spectrum;
  identifying a flow condition at one or more depths within the wellbore based on determining that the plurality of frequency domain features match a flow condition event signature;
  correlating the identified flow condition with the induced pressure differential; and
  determining a presence and location of the flow condition within the wellbore based on the identification and the presence of the flow condition and the correlating of the flow condition with the induced pressure differential;
  generating an output that comprises the identification and location of the flow condition, wherein the output is displayed on a user interface.

18. The method of claim 17, wherein determining the plurality of frequency domain features of the sample data set comprises extracting the plurality of frequency domain features at each of the one or more depths having the amplitude above the surface amplitude threshold.

19. A system for detecting a leak event within a wellbore or a formation, the system comprising
  a receiver unit comprising a processor and a memory, wherein the receiver unit is configured to receive a first signal from a sensor disposed in a wellbore, wherein a processing application is stored in the memory, and wherein the processing application, when executed on the processor, configures the processor to:
  receive the first signal from the sensor, wherein the signal comprises an indication of an acoustic signal received from the sensor disposed in the wellbore at one or more depths within the wellbore, wherein the signal is indicative of the acoustic signal across a frequency spectrum,
  receive a second signal comprising an indication of an induced pressure differential within the wellbore,
  determine a plurality of frequency domain features of the acoustic signal across the frequency spectrum at each depth of the one or more depth within the wellbore, wherein each frequency domain feature of the plurality of frequency domain features at each depth are derived from across the frequency spectrum,
  compare the plurality of frequency domain features to a leak event signature,
  identify the leak event at a first depth of the one or more depths within the wellbore based on the plurality of frequency domain features matching the leak event signature at the first depth of the one or more depths in the wellbore,
  correlate the identified leak event with the induced pressure differential,
  determine a presence and location of the leak at the first depth within the wellbore based on the identification of the leak event and the correlation of the leak event with the induced pressure differential, and
  generate an output indicative of the presence and location of the leak event.

20. The system of claim 19, further comprising:
  the sensor, wherein the sensor comprises a fibre optic cable disposed within the wellbore; and
  an optical generator coupled to the fibre optic cable, wherein the optical generator is configured to generate a light beam and pass the light beam into the fibre optic cable.

21. The system of claim 19, wherein the wellbore comprises one or more tubular strings and one or more annuli disposed between at least one of: i) two adjacent tubular strings of the one or more tubular strings, ii) a tubular string of the one or more tubular strings and a formation, or iii) both i and ii, and wherein the processing application, when executed on the processor, further configures the processor to:
  determine a baseline condition within the wellbore based on the first signal when the wellbore is shut-in, wherein the pressure differential is indicative of a difference in pressure between a first annulus and an adjacent flow path in the wellbore and
  correlate the leak event with the baseline condition, wherein the presence and location of the leak are based, at least in part, on the correlation of the leak event with the baseline condition.

22. The system of claim 19, wherein the processing application, when executed on the processor, further configures the processor to:
  integrate over time or time average an acoustic intensity within specified frequency bands for the leak in the wellbore, and
  determine a relative fluid flowrate for the leak based on the integrated acoustic intensity.

23. The system of claim 19, wherein the processing application, when executed on the processor, further configures the processor to:
  determine a phase of a fluid at each leak.

24. The system of claim 19, wherein the induced pressure differential results from an induced fluid flow along a leak path within the wellbore, and wherein the output comprises a leak log.

25. The system of claim 19, wherein the plurality of frequency domain features of the acoustic signal comprise at least two of: a spectral centroid, a spectral spread, a spectral roll-off, a spectral skewness, an RMS band energy, a total RMS energy, a spectral flatness, a spectral slope, a spectral kurtosis, a spectral flux, spectral entropy, or a spectral autocorrelation function.

26. The system of claim 25, wherein the plurality of frequency domain features of the acoustic signal comprise the spectral centroid and the spectral spread.

27. The system of claim 19, wherein the processing application, when executed on the processor, further configures the processor to:
  obtain a second signal comprising an indication of a pressure or flow within the wellbore,
  compare the plurality of frequency domain features to an overburden event signature,
  determine a presence of an overburden event at one or more depths within the wellbore based on the plurality of frequency domain features matching the overburden event signature at one or more depths in the wellbore,
  correlate the overburden event with the pressure or flow,
  determine a presence and location of the overburden event within the wellbore based on the presence of the overburden event and the correlation of the overburden event with the pressure or flow, and
  generate an output indicative of the presence and location of the overburden event.

28. The system of claim 27, wherein the overburden event comprises a self-induced hydraulic fracture.

29. The system of claim 27, wherein the pressure or flow is indicative of a pressure or flowrate from a hydrocarbon zone in the wellbore.

30. The system of claim 27, wherein the processing application, when executed on the processor, further configures the processor to:
  integrate over time or time average an acoustic intensity within specified frequency bands for the overburden event, and
  determine a relative fluid flowrate change in the wellbore based on the integrated acoustic intensity.

* * * * *